US012158532B2

(12) United States Patent
Bergen

(10) Patent No.: US 12,158,532 B2
(45) Date of Patent: Dec. 3, 2024

(54) METHODS AND SYSTEMS FOR PROVIDING POSITIONING INFORMATION TO AIRCRAFT

(71) Applicant: DC-001, Inc., Los Alamitos, CA (US)

(72) Inventor: Scott Bergen, New Canaan, CT (US)

(73) Assignee: Spartan Radar, Inc., Los Alamitos, CA (US)

( * ) Notice: Subject to any disclaimer, the term of this patent is extended or adjusted under 35 U.S.C. 154(b) by 436 days.

(21) Appl. No.: 17/728,660

(22) Filed: Apr. 25, 2022

(65) Prior Publication Data

US 2023/0105917 A1    Apr. 6, 2023

Related U.S. Application Data

(63) Continuation-in-part of application No. 17/481,235, filed on Sep. 21, 2021, now abandoned.

(51) Int. Cl.
*G01S 19/40* (2010.01)
*G01S 5/02* (2010.01)
*G01S 19/46* (2010.01)

(52) U.S. Cl.
CPC .............. *G01S 19/40* (2013.01); *G01S 5/021* (2013.01); *G01S 5/0264* (2020.05); *G01S 5/0284* (2013.01); *G01S 19/46* (2013.01)

(58) Field of Classification Search
CPC ...... G01S 13/876; G01S 19/215; G01S 19/40; G01S 19/46; G01S 19/48; G01S 5/0205; G01S 5/021; G01S 5/0264; G01S 5/0273; G01S 5/0284
See application file for complete search history.

(56) References Cited

U.S. PATENT DOCUMENTS

| | | | | |
|---|---|---|---|---|
| 6,567,037 | B1* | 5/2003 | Fung | G01S 13/91 342/36 |
| 9,538,332 | B1* | 1/2017 | Mendelson | H04W 48/10 |
| 11,448,509 | B1* | 9/2022 | Kim | G01S 19/13 |
| 2014/0302869 | A1 | 10/2014 | Rosembaum et al. | |

(Continued)

OTHER PUBLICATIONS

International Search Report and Written Opinion mailed on Feb. 15, 2023 in International Patent Application No. PCT/US2022/044282, filed on Sep. 21, 2022, 17 Pages.

*Primary Examiner* — Timothy X Pham
(74) *Attorney, Agent, or Firm* — Nixon Peabody LLP

(57) ABSTRACT

The present disclosure generally pertains to systems and methods for autonomously detecting and correcting anomalies in position information provided to aircraft using radio-frequency signals. By enabling autonomously detecting and correcting for anomalies in the operation of a ground-based solution entirely independent of GPS, systems of the present disclosure can make the provided position information more accurate and robust, thereby enhancing the effectiveness and safety of navigation systems using the provided position information. More precisely, systems of the present disclosure may employ a series of ground-based beacon transmitters to provide radio-frequency (RF) signal pulse with a highly regular frequency. A locating receiver can detect the arrival times of these pulses and use this information to detect and report certain anomalies. These reports may then be used to autonomously correct the detected anomalies.

26 Claims, 14 Drawing Sheets

(56) References Cited

U.S. PATENT DOCUMENTS

| | | | |
|---|---|---|---|
| 2017/0199269 A1* | 7/2017 | Allen | G01S 5/12 |
| 2017/0234965 A1 | 8/2017 | Taylor, Jr. et al. | |
| 2017/0374572 A1 | 12/2017 | Kleinbeck et al. | |
| 2021/0088622 A1 | 3/2021 | Nishimoto | |
| 2021/0116558 A1 | 4/2021 | Chan et al. | |
| 2021/0286044 A1* | 9/2021 | Knuuttila | B64D 39/00 |
| 2023/0176579 A1* | 6/2023 | Rysdyk | G01S 5/14 |
| | | | 342/33 |

* cited by examiner

METHODS AND SYSTEMS FOR PROVIDING POSITIONING INFORMATION TO AIRCRAFT

CROSS REFERENCE TO RELATED APPLICATION

This application is a continuation-in-part of and claims priority to U.S. application Ser. No. 17/481,235, entitled "Systems and Methods for Providing Positioning Information to Aircraft" and filed on Sep. 21, 2021, which is incorporated herein by reference.

TECHNICAL FIELD

The present disclosure generally relates to geolocation, and more particularly, methods, systems, and non-transitory computer readable media for providing positioning information to aircraft using radio-frequency signals.

RELATED ART

Geo-positioning systems that can be used by a device to determine its location are a key part of many modern-day technologies. While not their only use, geo-positioning systems are a key aspect of the navigation systems integrated into various machines and devices. This is especially true for vehicles, where geo-positioning plays a key role, either indirectly through informing the actions of a human pilot or more directly through informing the actions of various on-board autonomous or semi-autonomous control systems. Given their central role, the availability and accuracy of geo-positioning systems are economically and important and, increasingly, a potential safety concern.

To date, most geo-positioning systems offer global coverage, i.e., can be used by a device anywhere on the globe, and are satellite-based. Specifically, most geo-positioning systems rely on a constellation of tens to hundreds of satellites orbiting the earth to provide the signals necessary for a device near the Earth's surface to determine its location. The earliest and most famous of these systems is the global positioning system (GPS) operated by the United States Space Force. The chief reason that, at present, most geo-positioning systems are satellite based is the (relative) ease and widespread coverage offered by satellites. Being based in space, a satellite has little obstruction between it and a large portion of the earth's surface. This relatively clear line-of-sight means that the signals from a single satellite can reach a large geographic area. This allows a relatively small number of satellites to reliably provide the coverage necessary (e.g., four visible satellites) for a device to determine its location.

However, being satellite based also makes existing geo-positioning systems suffer from several drawbacks. One drawback is that their space-based nature makes maintenance and repair of the satellites extremely difficult. The satellites spaced-based nature also makes them vulnerable to adverse space weather, such as solar storms. As a consequence, satellite-based geo-positioning systems have a small but significant chance of environment induced catastrophic failure that would be costly and, more importantly, time-consuming to repair. Moreover, satellite-based geo-positioning systems also suffer from the drawback that the energy of their signals is spread across a large area, making the signals received at (or near) earth's surface relatively weak (i.e., a low signal-to-noise ratio (SNR)). The low power of geo-positioning systems' signals make them vulnerable to being blocked by environmental effects and, more alarmingly, to being deliberately blocked across a wide area with a radio jammer. Finally, while not necessarily inherent to satellite-based geo-positioning systems, existing geo-positioning systems lack a sufficient means of authentication, making them vulnerable to deliberate spoofing. This is further compounded by the weakness of the system's signals, which allow a relatively simple setup to spoof positioning information across a wide region or from a significant distance.

These vulnerabilities of existing geo-positioning systems implicate important economic and safety concerns, given the importance of and reliance on accurate navigation across numerous vehicles. These concerns are especially heightened with regards to aircraft, for which conditions often require pilots to rely on instrumentation and for which incorrect GPS data can easily lead to fatal accidents. For these reasons, a secondary means of providing positioning information to aircraft and other vehicles is greatly desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
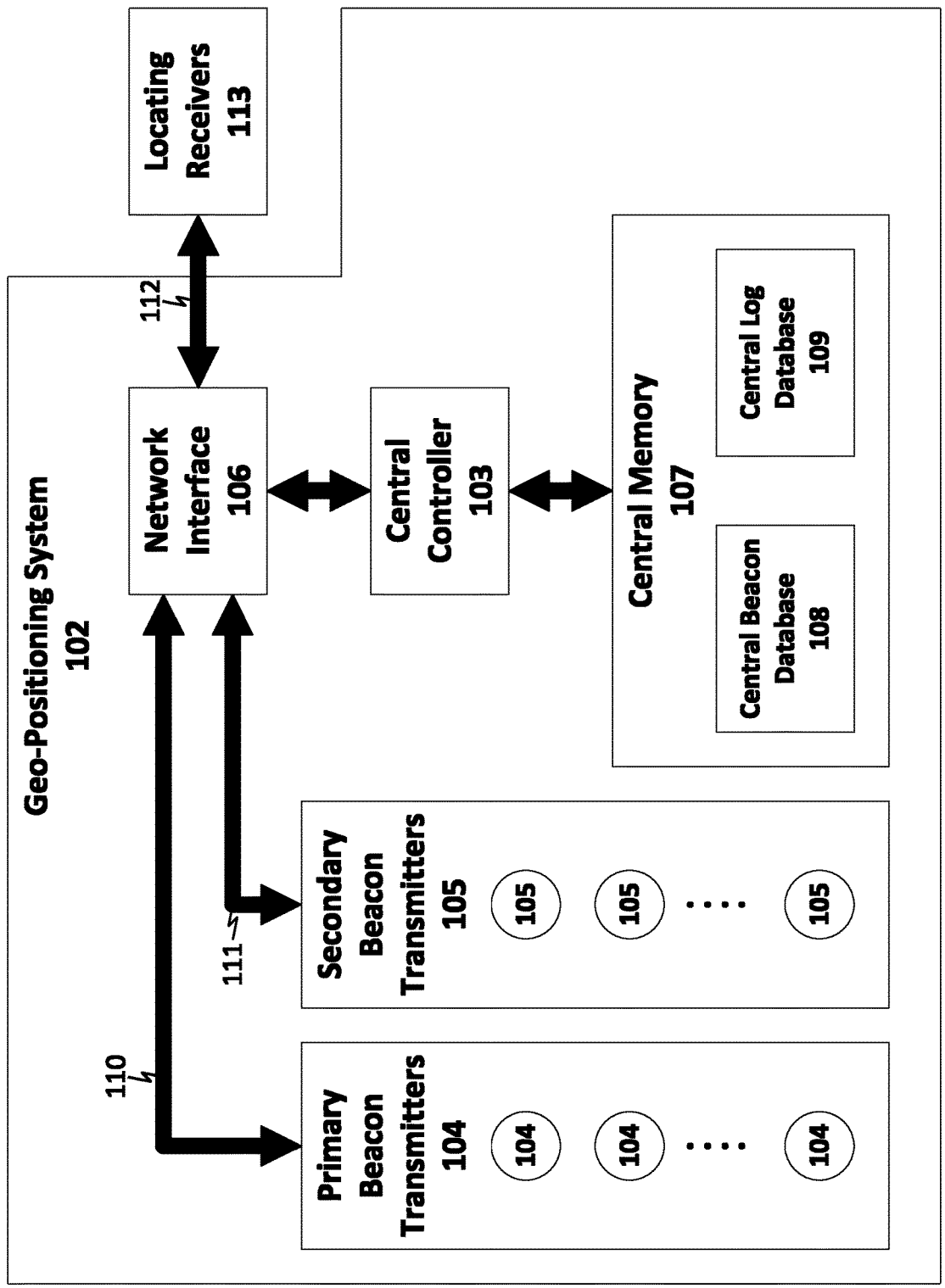
FIG. 1 is a block diagram of a geo-positioning system, in accordance with an exemplary embodiment of the present disclosure.

The present disclosure generally pertains to systems and methods for providing position information to aircraft using radio-frequency signals. These systems may be of use across a wide-range of applications, particularly those applications presently relying on GPS systems for geo-navigation. By providing a ground-based solution entirely independent of GPS, systems of the present disclosure can make navigation systems more accurate, by for example fusing the position information of the present system with GPS position information. It can also make these systems more robust, by providing a back-up in case of unavailability of the GPS constellation (e.g., due to a solar storm causing a failure in the GPS constellation or due to deliberate jamming of the GPS signal). Embodiments of the present disclosure also make navigation systems more robust by providing a check against deliberate falsification (e.g., spoofing) of GPS signals, by providing a means to check the validity of the GPS-derived position and by providing signals which are, by design, harder to jam or spoof.

More precisely, systems of the present disclosure may employ a series of ground-based beacon transmitters to provide coverage across a defined geographic region. In particular, several primary beacon transmitters may be distributed across this region. Using an accurate internal timing source, these beacon transmitters can generate a radio-frequency (RF) signal pulse at a consistent frequency. A much larger number of secondary beacon transmitters also spread through the defined geographic region may then re-transmit these RF signal pulses. The turnaround time for these secondary beacon transmitters, i.e., the time taken from the start of receiving a pulse and the beginning of transmitting the pulse, can be tightly controlled to be consistent across the secondary beacon transmitters. By knowing the distance between each of these beacon transmitters with respect to one another, a system can listen for the transmitted or re-transmitted pulses to determine its location. Specifically, the system can determine the arrival time of at least the RF signal pulses and, using stored information about the relative distance between the beacon transmitters, derive its location using an appropriate method, such as a multilateration algorithm.

As previously mentioned, the use of geo-positioning systems is important to numerous applications. In its broadest sense, a geo-positioning system refers to any mechanism for determining the geographic position of an object. At present, the most common and commercially important geo-positioning systems are satellite navigation systems operated by various governments, such as the Global Positioning System (GPS) operated by the United States, the Global Navigation Satellite System (GLONASS) operated by Russia, the BeiDou Navigation Satellite System (BDS) operated by China, and the Galileo system operated by the European Union. Because of their space-based nature, it is relatively easy for a satellite navigation system employing a relatively small number of satellites to provide positioning information to devices anywhere in a large region or, for most systems, any region across the Earth's surface.

The ability for a system to determine its geographic location (with accuracy within a few meters of its true position) is important for numerous applications. This is particularly so for vehicles, which often need to navigate across long distances that make other methods of navigation impractical. The space-based nature of existing geo-positioning systems have several downsides, however. Their space-based nature makes them vulnerable to adverse space weather while simultaneously making them difficult to repair and replace. Additionally, their distance and large area of coverage (due to their distance from the surface of the earth) results in signals with relatively low power near ground-level, resulting in a low signal-to-noise ratio. In addition to the normal problems that comes from a low signal-to-noise ratio, the low SNR of GPS satellites makes them vulnerable to deliberate disruption (e.g., signal jamming). This could be highly disruptive, given the large reliance on GPS systems for navigation, particularly for aircraft. Moreover, the lack of authentication mechanisms in GPS signals also renders them vulnerable to deliberate falsification (e.g., spoofing). This could be particularly dangerous, given the reliance of both human pilots and autonomous or semi-autonomous navigation systems on GPS for determining location. This is particularly so for commercial aircraft, which often need to navigate and land in conditions that require relying significantly on flight deck instrumentation to determine their position.

To better address these issues, embodiments of the present disclosure may utilize various beacon transmitters to broadcast signals from which a properly configured locating receiver may determine its location. Specifically, embodiments of the present disclosure may utilize several primary beacon transmitters to periodically generate an RF signal pulse. For each of these primary beacon transmitters, the beacon transmitter may employ a timing source to ensure the consistency of the RF signal pulse. Also utilized are a plurality of secondary beacon transmitters, which receive the RF signal pulse from the primary beacon transmitters (or the re-transmitted RF signal pulse from other secondary beacon transmitters) and re-transmit it. The turnaround time of each beacon transmitter may be carefully calibrated to be consistent within some interval. The effect of the consistent turnaround time and the consistency of the primary beacon transmitters allows these signals, if the distance between the beacon transmitters are all known, to be used by a receiving system to derive its own location using various techniques, such as multilateration.

FIG. 1 shows a block diagram of a geo-positioning system 102, in accordance with an exemplary embodiment of the present disclosure. As shown by the figure, a geo-positioning system 102 may comprise a controller 103, one or more primary beacon transmitters 104, one or more secondary beacon transmitters 105, a network interface 106, and a central memory 107. The controller 103 may be used to "manage" the geo-positioning system 102 and its various components as described in more detail below. Towards this end, the controller 103 may be connected to the central memory 107, where various information, such as details on the primary beacon transmitters 104 and secondary beacon transmitters 105, are stored (and accessible by the controller 103 when needed). Similarly, the controller 103 may be connected to the network interface 106, which may be used to interact with other devices. In some embodiments, such as is shown in FIG. 1, the network interface 106 may connect to (and thus the controller 103 may indirectly connect to) the primary beacon transmitters 104 and the secondary beacon transmitters 105 over connections 110 and 111, respectively. In other embodiments, the network interface 106 may not connect to the primary beacon transmitters 104 and the secondary beacon transmitters 105 and the central controller 103 may accordingly not have a connection to the beacon transmitters.

The primary beacon transmitters 104 and the secondary beacon transmitters 105 may be configured to transmit or re-transmit RF signal pulses such that the RF signal pulses are distributed across a geographic region. These RF signal pulses may be used by properly configured equipment, shown here as locating receiver 113, to determine their respective positions. To achieve this distribution, various aspects of the primary beacon transmitters 104 and the secondary beacon transmitters 105 may be configured (e.g., the primary beacon transmitters' set RF signal pulse frequency). In embodiments where the central controller 103 is connected to the beacon transmitters (e.g., through the network interface 106), the central controller 103 may be used to configure the beacon transmitters. When connected, the central controller 103 may also collect various diagnostic from the beacon transmitters. This may involve communicating with the beacon transmitters through the network interface 106 (and thus through connections 110 and 111). In general, the connections 110 and 111 may utilize a variety of wired or wireless mediums (and may use multiple such mediums) to connect the network interface 106 to a particular beacon transmitter. Moreover, the technology used to connect the network interface 106 and the various beacon transmitter 104 and 105 may vary between beacon transmitters. For example, it may include wireless transmission (e.g., LTE, Wi-Fi, etc.) as well as wired connections (e.g., Ethernet, fiber-optics, etc.).

Note that, each of the primary beacon transmitters 104 is physically located at a site referred to as a primary beacon location (i.e., the RF signal pulses are generated at and transmitted from one or more primary beacon locations that are associated with the one or more primary beacon transmitters 104). Similarly, each of the secondary beacon transmitters 105 is physically located at a site referred to as a secondary beacon location (i.e., the RF signal pulses are received and re-transmitted from a plurality of secondary beacon locations associated with the plurality of secondary beacon transmitters 105).

As described above, the controller 102 is connected to and able to interact with the central memory 107. Among other things, the central memory 107 may store a central beacon transmitter database 108 and a central log database 109. The central beacon transmitter database 108 may contain information indicating the (geographic) position of each of the primary and secondary beacon transmitters. This information may be encoded in and stored as a variety of coordinate systems. For example, the central beacon transmitter database 108 may use a spherical coordinate system, meaning it lists the latitude, longitude, and elevation of each of the primary and secondary beacon transmitters. The relative position of the beacon transmitters from one another can be used to determine the relative distance between the beacon transmitters. In particular, it can be used to determine the distance between a primary beacon transmitter and a re-transmitting secondary beacon transmitter. The central beacon transmitter database 108 may also contain information indicating the turnaround times of the various secondary beacon transmitters 105. The network interface 106 may be used to distribute the central beacon transmitter database 108 to various locating receivers 113.

To some extent, the ability to use the RF signal pulses to determine a location relies on knowing the relative positions of the primary beacon transmitters 104 (i.e., the primary beacon locations) and the relative positions of the secondary beacon transmitters 105 (i.e., the secondary beacon locations). Preferably, this information is pre-determined and pre-stored on the locating receivers (e.g., locating receivers 113). Thus, in most embodiments, at some point prior to the operational start of the geo-positioning system 102, the locations of the primary beacon transmitters 104 and the secondary beacon transmitters 105 are determined. This information may then be used to populate the central beacon transmitter database 108. Likewise, to some extent, the ability to use the RF signal pulses to determine a location relies on knowing the turnaround times of the secondary beacon transmitters 105. This information is also preferably pre-determined and pre-stored on the locating receiver (e.g., a locating receiver 113). Thus, in most embodiments, at some point prior to the operational start of the geo-positioning system 102, the turnaround times of the secondary beacon transmitters 105 may be determined, and this information may then be used to populate the central beacon transmitter database 108. This information may then be distributed to various locating receivers that are configured to work with geo-positioning system 102.

However, in theory, it is possible for a locating receiver (e.g., a locating receiver 113) to dynamically determine the relative positions and turnaround times of the primary beacon transmitters 104 and secondary beacon transmitters 105 without having this information pre-determined and stored. By performing a series of maneuvers, the locating receiver may record how the detectable RF signal pulses from nearby primary beacon transmitters 104 and secondary beacon transmitters 105 change throughout the course of the maneuvers. Simultaneously, the locating receiver may use a secondary positioning system, such as a GPS receiver or an inertial navigation system (INS), to determine the locating receiver's (relative or absolute) position throughout the series of maneuvers. In particular, this allows the locating receiver to determine the (relative or absolute) position that each of the RF signal pulses were received at.

The locating receiver can then use the received RF signal pulses and their corresponding receive-locations to determine how the characteristics of the RF signal pulses (e.g., their strength, the relative timing between the RF signal pulses, their relative direction) vary as the locating receiver's position varies. In turn, the locating receiver can use this information to constrain the (relative) location of the beacon transmitters to a desired degree of accuracy (e.g., to be at a certain position ±10 meters). A similar process can be used to determine the secondary beacon transmitters' turnaround times. These two also may be combined, such that some information about the primary beacon transmitters 104 and secondary beacon transmitters 105 is pre-stored (e.g., relative location data for some but not all of the beacon transmitters) while the remaining information is dynamically determined as needed.

Note that, once the relative location (i.e., relative coordinates) of the beacon transmitters 104 and 105 is determined to the desired accuracy, the locating receiver may then determine corresponding geographic coordinates (e.g., latitude, longitude, and elevation) for each of the beacon transmitter's relative coordinates). In other words, the relative location of the locating receiver with respect to the beacon transmitters does not necessarily directly convey the location of the locating receiver with respect to any other geographic features of interest (e.g., its location relative to a city or airport, for example). Thus, to determine the locating receiver's location relative to these features, what may be done is to use the relative location to determine a corresponding geographic location. This geographic information (e.g., geographic coordinates such as latitude, longitude, and elevation) then does convey the location of the locating receiver with respect to other geographic features of interest (whose geographic location coordinates are known).

One way that the geographic coordinates of a locating receiver maybe determined from its relative location involves determining the absolute geographic coordinates for at least one of the relative coordinates. This may then be used to pin the relative coordinates and geographic coordinates, allowing the corresponding geographic coordinates to be determined for any other relative coordinates. For example, the locating receiver may use the RF signal pulses to determine its location (i.e., its coordinates) in the determined relative coordinate system (i.e., relative to the beacon transmitters). Simultaneously, the locating receiver may use the secondary positioning system to obtain its geographic coordinates (e.g., the latitude, longitude, and elevation). Alternatively, the absolute position of at least one of the beacon transmitters 104 and 105 may be pre-stored in the locating receiver. In either case, the geographic coordinates-relative coordinates pair may be used, along with the determined relative position information of the beacon transmitters (particularly the relative position information of all the other beacon transmitters relative to the beacon transmitter whose absolute position is known) to determine the absolute position of the remaining beacon transmitters.

The central log database 109 may contain information indicating logs received from various locating receivers (and possibly other components of the geo-positioning system 102, such as the primary beacon transmitters 104 or the secondary beacon transmitters 105). Some of the logs may be retrieved from various locating receivers through the network interface 106. These logs could include things such as position anomalies detected by the various locating receivers and the like. These logs may be accessed by the controller 103 and used to calibrate various aspects of the geo-positioning system 102. For example, the logs may be used to correct erroneous turnaround times for the secondary beacon transmitters 105 that are stored in the central beacon transmitter database 108. The logs may also be used to correct incorrect position information for the primary beacon transmitters 104 or the secondary beacon transmitters 105 stored in the central beacon transmitter database 108. The network interface 106 may be used to distribute the updates to the central beacon transmitter database 108 to copies of the database stored on various locating receivers (e.g., the locating receiver of FIG. 8).

In addition, the logs in the central log database 109 may also be used to determine if there (likely) is a deliberate attack on (e.g., an attempt to manipulate, interfere with, or subvert) the geo-positioning system 102. For example, if there is an attempt to spoof or jam the RF signal pulses coming from one or more primary beacon transmitters 104 or secondary beacon transmitters 105. As an example, a jamming attempt may be evident from logs indicating an unexpectedly low SNR for a given RF signal pulse when at a given distance from the originating beacon transmitter. As another example, a spoofing attempt may be evident from logs indicating a double RF signal pulse. A double RF signal pulse, as used here, means two RF signal pulses seemingly from the same beacon transmitter that follow (and potentially partially overlap) one another closely in time (e.g., significantly shorter than the expected frequency for the given RF signal pulses).

At a high level, the geo-positioning system 102 works by providing a plurality of precisely-timed RF signal pulses that can be used by a properly configured receiver (e.g., a locating receiver) to determine its location (e.g., using various multilateration techniques). Generally speaking, the number of signals (i.e., RF signal pulses) a receiver needs to determine its location depends on the number of coordinates it is attempting to determine. Specifically, the minimum number of signals is typically one greater than the number of dimensions (e.g., number of coordinates). For example, for a system to determine its location in three-dimensional (3D) space (e.g., determine its latitude, longitude, and altitude using multilateration), four RF signal pulses (three dimensions plus one more) may be needed. However, if an independent source can be used to determine one dimensions (e.g., a radar altimeter is used to determine altitude), one less RF signal pulse may be needed (e.g., three RF signal pulses).

To accomplish this goal, the primary beacon transmitters 104 and the secondary beacon transmitters 105 of the geo-positioning system 102 work to cover an area, called the service area, with RF signal pulses such that for a majority of locations (and ideally all locations) within the geographic region, there are a sufficient number of detectable RF signal pulses (e.g., at least three RF signal pulses) for a properly configured receiver to determine its location. Generally speaking, this requires a distribution of the primary beacon transmitters 104 and the secondary beacon transmitters 105 across the desired service area, with various factors, such as the local topology, the beacon transmitters' transmission power, and the size of the service area partially determining the needed number and physical layout of the primary beacon transmitters 104 and the secondary beacon transmitters 105. Note that the physical area occupied by the geo-positioning system 102 (specifically, the physically area encompassed by the primary beacon transmitters 104 and the secondary beacon transmitters 105) may not precisely align with the service area created by those beacon transmitters.

To use the RF signal pulses to determine a location, locating receivers may detect an RF signal pulse (i.e., from a primary beacon transmitter 104) and/or detect re-transmission of the RF signal pulse (i.e., from various secondary beacon transmitters 105). If a sufficient number of RF signal pulses are detected, a locating receiver may utilize the arrival times of the RF signal pulses (as determined by the locating receiver's clock) to determine its location (e.g., determine its location relative to the beacon transmitters 104 and 105 to be at a certain (relative) position ±1 meter). In particular, the locating receiver may use a constellation of received RF signal pulses to determine the identity of the transmitting (or re-transmitting) beacon transmitters and then use the relative locations of the beacon transmitters (particularly their distances from the primary beacon transmitter that originated the RF signal pulse) and the turn-around times of the secondary beacon transmitters to adjust the relative arrival times of the received RF signal pulses. These adjusted arrival times, because of the corrections, may then be thought of as having been transmitted simultaneously, allowing any of various multilateration techniques or other types of techniques to uniquely determine the spatial location that the sequence of RF signal pulses detected by the locating receiver could have been received given the distribution of the beacon transmitters in geo-positioning system 102.

The positioning information determined by a locating receiver 113 using the RF signal pulses provided by the geo-positioning system 102 may be used by the locating receiver 113 or a system attached to the locating receiver 113 for various purposes. The most straightforward use is in navigation systems, where the position information from the locating receiver 113 (which, typically, is the location of the positioning receiver 113 and thus, the position of any physical system (e.g., an aircraft) that the locating receiver 113 is attached to) is used to navigate to a desired destination. Another use of the positioning information determined by a locating receiver 113 is for a physical system connected to the locating receiver 113 (e.g., an aircraft) to determine the presence of errors (either accidental or deliberate) in the positioning information obtained from other connected positioning systems, such as a GPS receiver or an INS.

Figure 2:
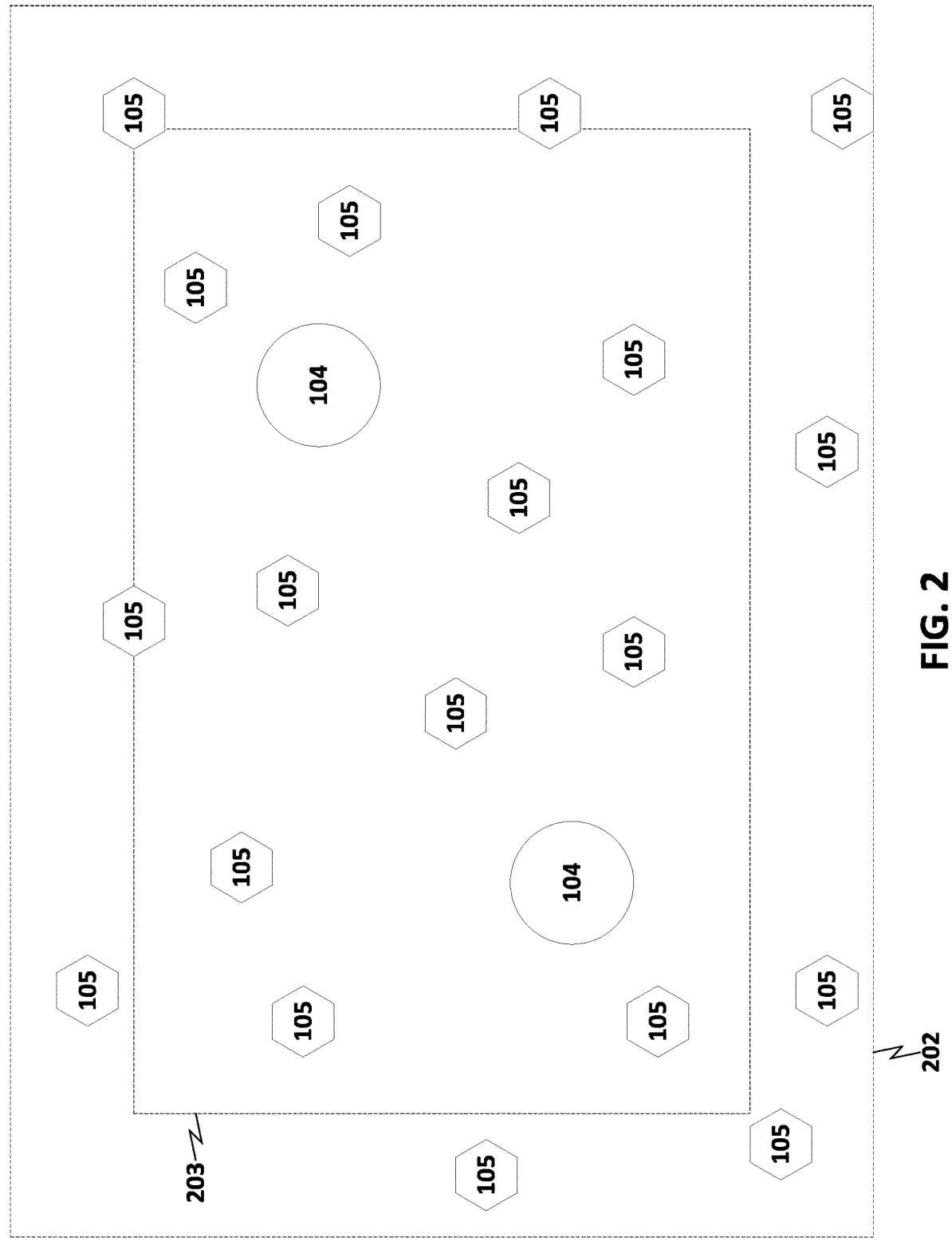
FIG. 2 is an illustration of a service area, in accordance with an exemplary embodiment of the present disclosure.

FIG. 2 shows a block diagram of a simplified geographic layout of an example geo-positioning system 102. As shown by the figure, the primary beacon transmitters 104 (two, in this figure) are spread out across an area, with each primary beacon transmitter 104 surrounded by several secondary beacon transmitters 105. Collectively, the beacon transmitters are placed anywhere in the beacon transmitter region 202 and, through their RF signal pulses, create a service area 203.

Figure 3:
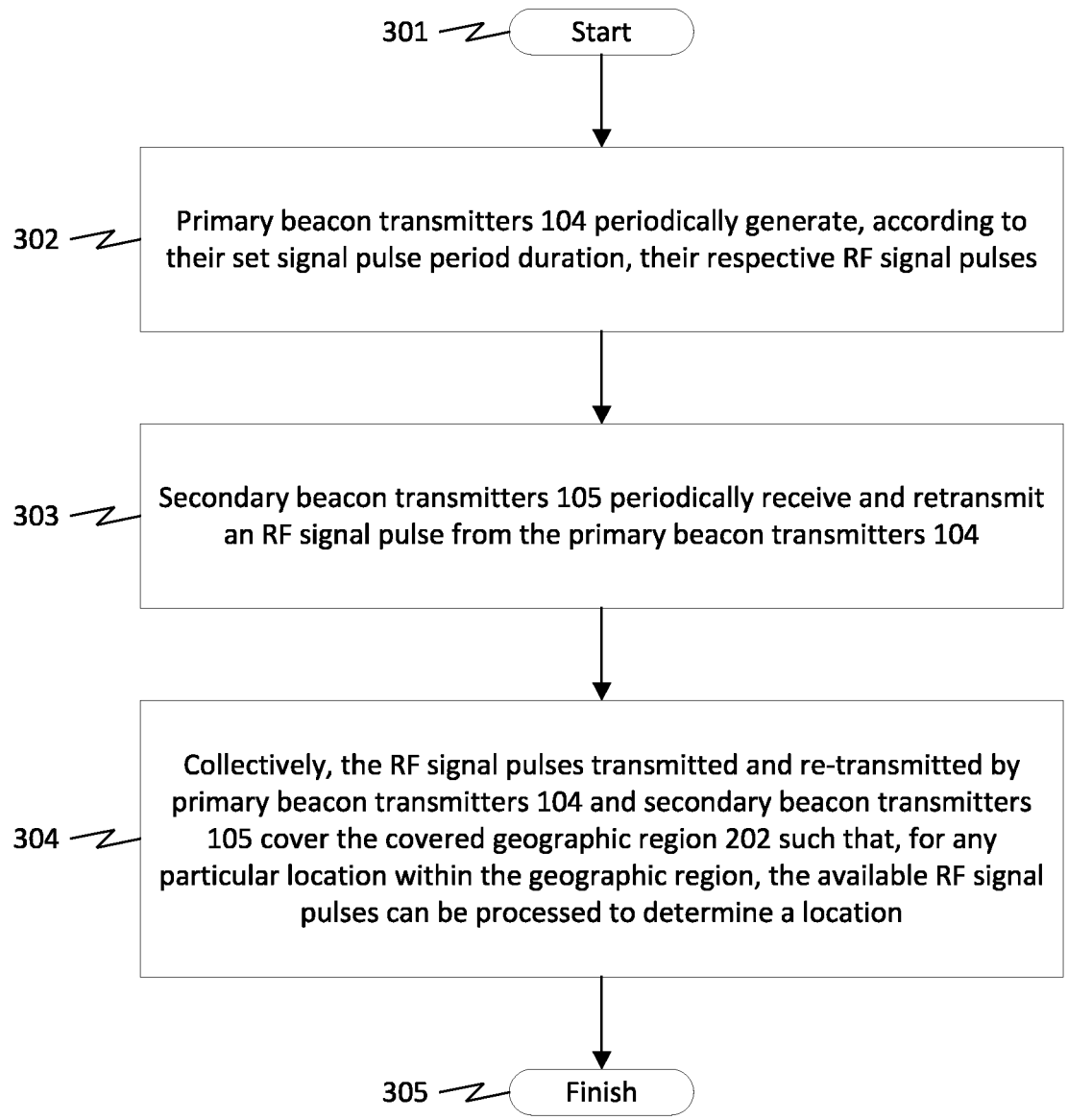
FIG. 3 is a flowchart illustrating a process of providing positioning information using radio-frequency signals.

FIG. 3 is a flowchart illustrating a process of providing positioning information using radio-frequency signals as described above.

To start, as shown by block 302 of FIG. 3, one or more primary beacon transmitters 104 periodically generate RF signal pulses. More precisely, each of the primary beacon transmitters 104 has an associated signal pulse frequency (i.e., how often it transmits an RF signal pulse). Equivalently, each of the primary beacon transmitters 104 has an associated signal pulse period (i.e., the duration between successive RF signal pulses) that is the inverse of the associated signal pulse frequency. Based on their associated signal pulse frequency, each of the primary beacon transmitters 104 generates an RF signal pulse after every signal pulse period, yielding a signal pulse frequency number of RF signal pulses per second. As discussed further below, each of the primary beacon transmitters 104 may have an internal timing source that is used to reduce the deviation of the actual frequency at which the RF signal pulses are transmitted from the associated signal pulse frequency. The primary beacon transmitters 104 may also encode certain information into the RF signal pulses (e.g., by using amplitude modulation to vary the amplitude of the RF signal pulse).

Parallel to the activity of the primary beacon transmitters, as shown by block 303 of FIG. 3, a plurality of secondary beacon transmitters 105 may (at slightly different times) receive and then re-transmit the RF signal pulses transmitted from the one or more primary beacon transmitters. More precisely, each of the secondary beacon transmitters 105 may be monitoring for an RF signal pulse from one or more of the primary beacon transmitters 104. When it detects an RF signal pulse from a primary beacon transmitter 104, a secondary beacon transmitter 105 may capture the RF signal pulse (e.g., by taking sufficient samples of the incoming RF signal pulse and using the incoming samples to determine the parameters of the received RF signal pulse), store it in memory, and then retransmit the stored RF signal pulse.

As discussed further below, the length of time between when a secondary beacon transmitter 105 first begins to receive an RF signal pulse and then first begins to retransmit that RF signal pulse is known as that beacon transmitter's turnaround time. The accuracy of the position information of the geo-positioning system 102 partially depends on the consistency of the turnaround time for each secondary beacon transmitter 105. Accordingly, the secondary beacon transmitters 105 may be configured to ensure that, for a given secondary beacon transmitter 105, the secondary beacon transmitter's turnaround time is consistently within a certain range (e.g., 100 microseconds, ±1 microsecond; 10 nanoseconds, ±1 nanosecond, 1 nanosecond, ±100 picoseconds). In general, the smaller the consistent range of the secondary beacon transmitters' turnaround times, the greater the possible accuracy of the positioning information obtained by the geo-positioning system 102. The secondary beacon transmitters 105 may also encode certain information into the RF signal pulses (e.g., by using any suitable modulation method on the RF signal pulse, such as amplitude modulation (AM) or quadrature amplitude modulation (QAM)).

As a result of this activity, as shown by block 304 of FIG. 3, a geographic region, known as the service area (e.g., service area 203 of FIG. 2) is covered with propagating RF signal pulses. The primary beacon transmitters 104 and the secondary beacon transmitters 105 are distributed across a geographic region, known as the beacon transmitter region (e.g., beacon transmitter region 202 of FIG. 2), such that, for most anywhere within the geographic region, a sufficient number of RF signal pulses are available for a locating receiver to use the RF signal pulses to determine its location. The exact method by which a locating receiver uses the RF signal pulses to determine its location may vary based on the exact information encoded into the RF signal pulses. For example, if the RF signal pulses are also encoded with information identifying the transmitting primary beacon transmitter 104 and (if applicable) the re-transmitting secondary beacon transmitter 105, the processing required by the locating receiver to determine its location may be simplified.

Figure 4:
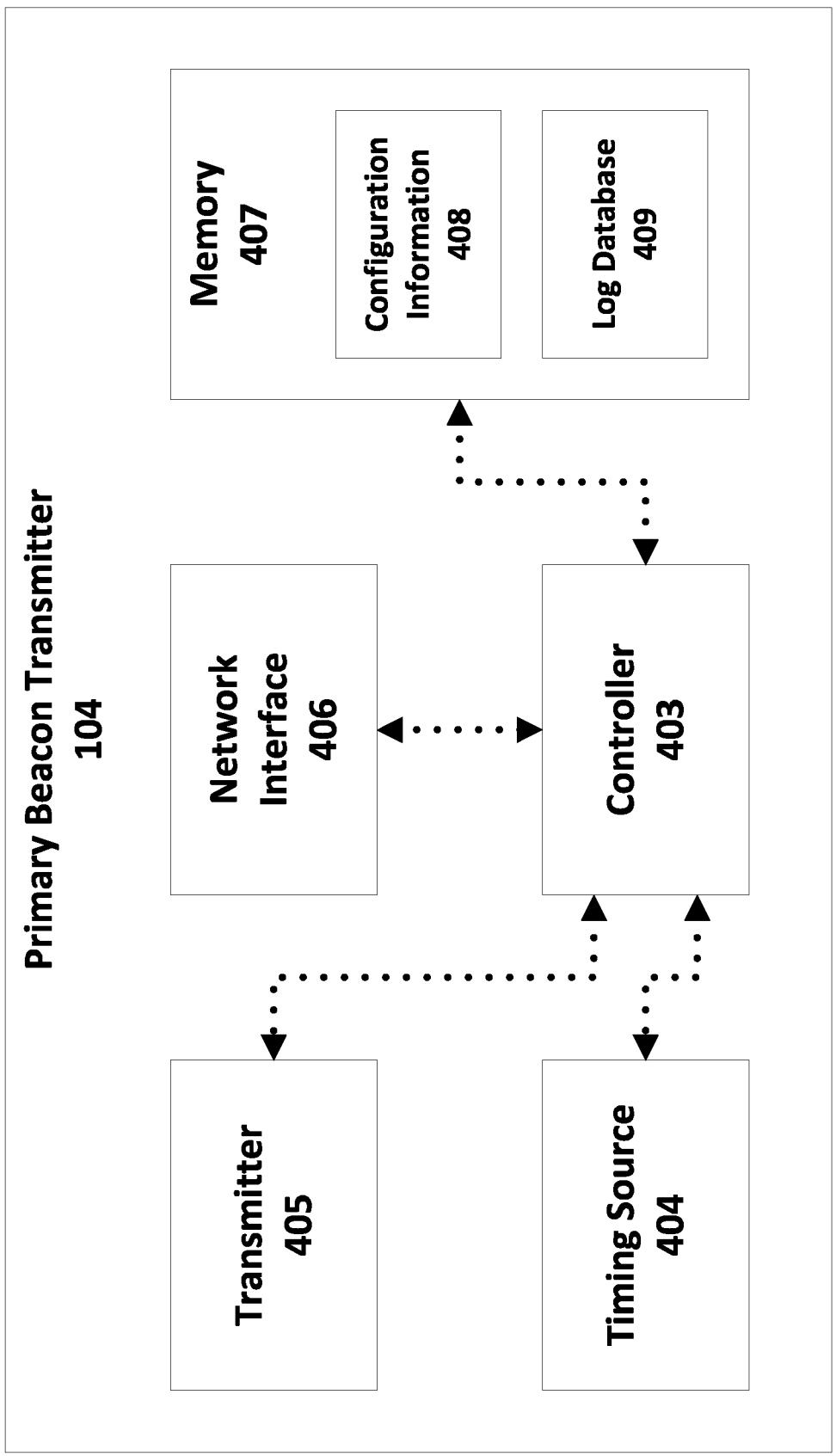
FIG. 4 is a block diagram of a primary beacon transmitter, such as is depicted by FIG. 1.

FIG. 4 shows a block diagram of a primary beacon transmitter 104, in accordance with an exemplary embodiment of the present disclosure. As shown by the figure, a primary beacon transmitter 104 may comprise a controller 403, a timing source 404, and a transmitter 405. The controller 403 may control the various components of the primary beacon transmitter 104 to orchestrate the functioning of the beacon transmitter. The timing source 404 may generate a timing signal that can be used to track the passage of time. The transmitter 405 may generate and emit an RF signal pulse. In general, the RF signal pulse may be composed of multiple sub-signals (e.g., multiple sub-signal pulses) that combine to form the overall RF signal pulse. In the simplest case, the RF signal pulse may be composed of a single sub-signal.

More precisely, the controller 403 is connected to the timing source 404 and the transmitter 405. The controller 403 may receive from the timing source 404 an oscillating signal with a stable frequency, which the controller 403 can use to measure the passage of time. The controller 403 may also interact with the transmitter 405 to cause the transmitter 405 to generate and transmit an RF signal pulse.

The primary beacon transmitter 104 may also comprise a memory 407 that is connected to and editable by the controller 403. The memory 407 may store, among other things, configuration information 408 and log database 409. The configuration information 408 may contain information indicating various parameters of the primary beacon transmitter 104, such as its signal pulse frequency. The log database 409 may contain logs recorded by the controller 403 about the operation of the primary beacon transmitter 104. These logs could include things such as operational anomalies, ambient conditions around the primary beacon transmitter 104, and the like.

The primary beacon transmitter 104 may also comprise a network interface 406 that is connected to the controller 403 and used to communicate with the controller 103 of the geo-positioning system 102. The network interface 406 can be used to obtain changes to the configuration of the primary beacon transmitter 104 (e.g., changes to configuration information 408) from the controller 103 and to report various stored logs (e.g., from log database 409) to the controller 103.

In operation, the primary beacon transmitter 104 works by having the controller 403 monitor the oscillating signal from the timing source 404. Once a certain number of oscillations have occurred, which corresponds to the passage of a certain amount of time, an RF signal pulse is generated. Specifically, after the set amount of time has passed, the controller 403 interacts with the transmitter 405 to cause the transmitter 405 to generate and transmit a desired RF signal pulse. In some embodiments, the primary beacon transmitter 104 may have an associated identifier (e.g., ID number) that uniquely identifies the primary beacon transmitter 104. In this case, the generated RF signal pulse may encode the identifier associated with the primary beacon transmitter 104 by amplitude modulating the pulse.

Note that, in general, the transmitter 405 comprises an antenna which is used to convert an electrical signal into a corresponding RF signal pulse. In the simplest case, this antenna may be omnidirectional (e.g., transmitting equally in all directions). In some embodiments, however, the antenna may be directional. This may be used, for example, to overcome adverse geographical features or to extend an RF signal pulse further in a specific direction.

In terms of technology, the timing source 404 may be any variety of devices with sufficient enough resolution (i.e., large frequency) and sufficient precision (i.e., stable frequency) to consistently have the period between RF signal pulses be within 100 microsecond of one another (and thus have the frequency between consecutive pairs of RF signal pulses be within 1 megahertz of one another). Typically, the internal timing of the controller 103 may need to have a clock cycle with (at least) a similar precision as the timing source 404. In particular, so as to not let inconsistent times between its internal operations skew the timing between RF signal pulses beyond 100 microsecond of one another. In practice, existing technology are more than sufficient to meet this precision requirement. For example, existing and commercially available field programmable gate arrays (FPGAs) are able to achieve a timing precision and clock cycle consistency to within 1 nanoseconds. More specialized or experimental hardware is able to achieve even greater accuracy and precision.

The controller 403 may be implemented in hardware or a combination of hardware and software. As an example, the controller 403 may comprise one or more FPGAs or one or more application-specific integrated circuits (ASICs). In some embodiments, the controller 403 may comprise one or more processors (e.g., central processing units (CPUs) or microprocessors) programmed with software that when executed by the processor cause the processor to perform the functions described herein for the controller 403. In other embodiments, other configurations of the controller 403 are possible.

Figure 5:
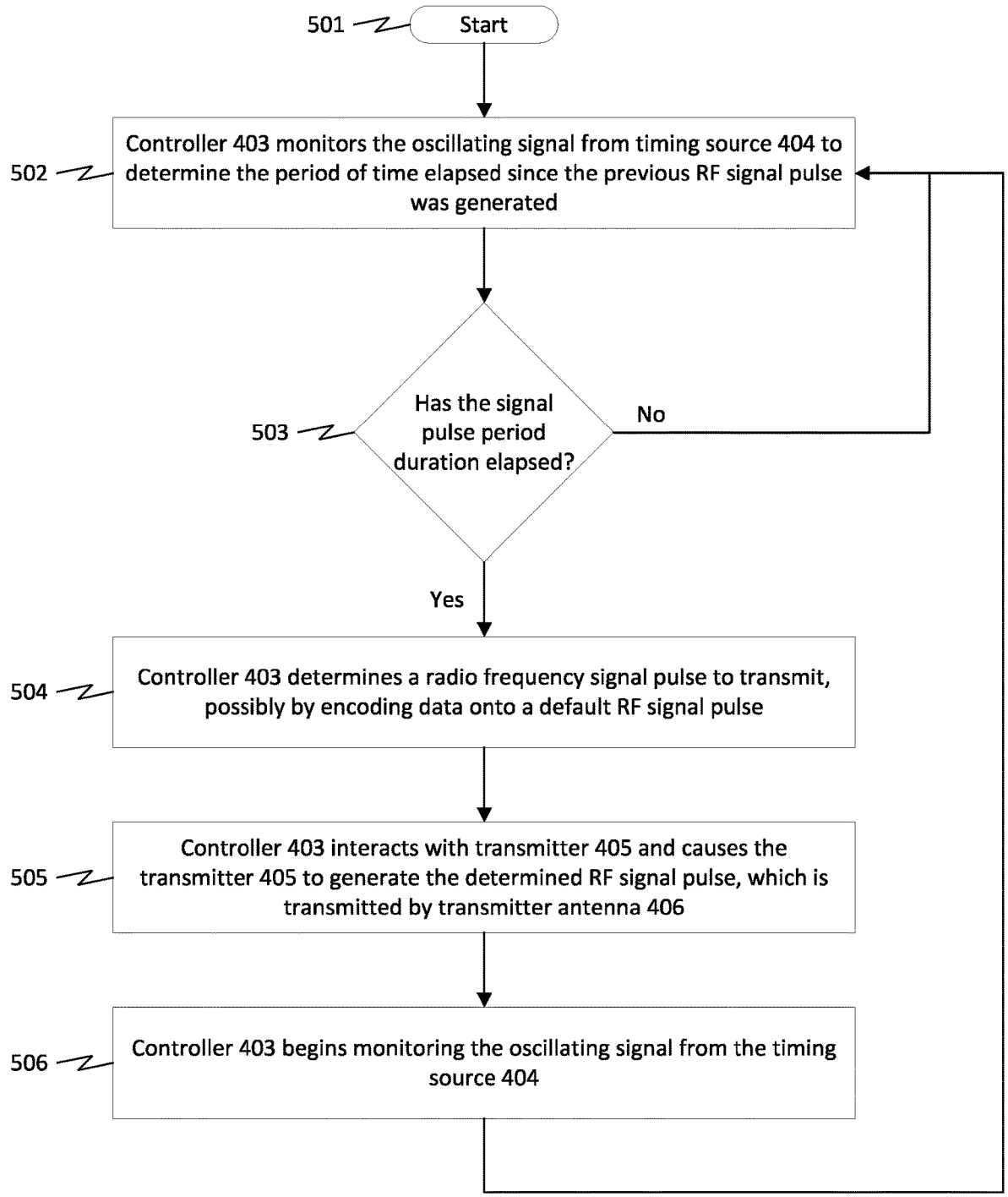
FIG. 5 is a flowchart illustrating the operation of a primary beacon transmitter.

FIG. 5 is a flowchart illustrating the operation of a primary beacon transmitter, such as was described in block 302 of FIG. 3.

To start, as shown by block 502 of FIG. 5, the primary beacon transmitter 104 monitors the timing source 404 to track the amount of elapsed time. Specifically, the controller 403 monitors the oscillating signal generated by the timing source 404 to determine the amount of time elapsed since the previous RF signal pulse was generated. Essentially, the timing source 404 is used to determine when the next RF signal pulse is generated. Typically, the timing source 404 is a stable oscillator, generating an electrical signal with a known frequency (e.g., 4.0 gigahertz (GHz)). Since the frequency is known, counting the number of oscillation also effectively measures the amount of time that has passed. If this is the initial startup of the primary beacon transmitter 104, there may not be a previous RF signal pulse. In this case, the (initial) RF signal pulse can be generated at an arbitrary time, but would typically be generated whenever the primary beacon transmitter has completed start-up and is ready to begin operating.

As shown by block 503 of FIG. 5, the controller 403 evaluates the amount of time elapsed and compares it to the set signal pulse period duration. If the controller 403 determines that a set signal pulse period duration has not elapsed since the previous RF signal pulse was transmitted, the process repeats at block 502 (i.e., the beacon transmitter controller 403 continues to monitor the time elapsed since the last RF signal pulse was transmitted). On the other hand, if the controller 403 determines that a set signal pulse duration has elapsed since the previous RF signal pulse was transmitted, the process proceeds to block 504.

In practical terms, this could mean that the timing source 404 is used to update an internal value representing the current time. Simultaneously, a timestamp indicating when the last RF signal pulse was transmitted may also be stored. The controller 403 could then compare the internal absolute time to this timestamp and act when they are equal. Alternatively, the timing source 404 could be used to increment the value in a counter tracking the number of pulses from the timing source 404 that have occurred since the last RF signal pulse was transmitted. Since the frequency of the timing source 404 is known (and presumed stable), a value could be recorded in memory representing the number of oscillations from the timing source 404 that occur in the set signal pulse period duration. The controller 403 could then compare the value of the counter with the recorded value and act when they are equal.

As shown by block 504 of FIG. 5, if the controller 403 determines that a signal pulse period duration has elapsed since the last RF signal pulse was transmitted, the primary beacon transmitter 104 may determine a radio-frequency signal to generate and transmit. The controller 403 may have a default base RF signal pulse (e.g., a simple sinusoid pulse) that it uses. In some cases, the controller 403 may modify the default RF signal pulse to encode information.

For example, in some embodiments the controller 403 may modify the default RF signal pulse to encode information indicating the identity of the transmitting primary beacon transmitter 104. In particular, the controller 403 could use amplitude modulation (AM) to superimpose a data signal over the default RF signal pulse. From a discrete point of view, this involves slightly modifying the amplitude of the default RF signal pulse (i.e., increasing or decreasing the amplitude) based on whether the data signal encodes (for a binary data signal) a 0 or 1 (e.g., increasing the amplitude when the data signal is a 1 and decreasing the amplitude when the data signal is a 0). Additionally, if the RF signal pulse comprises two orthogonal sub-signals, the controller 403 could use quadrature amplitude modulation (QAM) to encode information (e.g., information indicating the identity of the transmitting primary beacon transmitter 104).

Note that, in general, the pulse width (i.e., the duration) of the RF signal pulse, the signal-to-noise ratio of the transmitted RF signal pulse (at a given distance), and the amount of information (e.g., the number of bits) that can be encoded into a default RF signal pulse are correlated. To understand why, note that, in general, for a fixed signal pulse shape and max amplitude, the pulse width of the transmitted RF signal pulse significantly affects the total radiant energy contained in the signal-pulse. Generally, a higher total radiant energy (for a given signal pulse) results in a higher signal-to-noise ratio (for a fixed amount of background noise). Further, a signal needs a certain SNR at the receiver to be detected, depending on the capabilities of the receiver, and the SNR decreases at a rate proportional to the square of the increase in distance (i.e., the inverse-square law). Since signal duration increases the SNR, the longer the signal duration, the greater the distance at which the signal can be detected. Conversely, the greater the number of bits encoded in a signal, the higher the SNR needed to reliably detect those bits. Thus, for a given distance and minimum SNR, the greater the pulse-width, the greater is the number of bits that can be encoded into the RF signal pulse.

As shown by block 505 of FIG. 5, after the controller 403 determines an RF signal pulse to transmit, the determined RF signal pulse is transmitted. More precisely, the controller 403 interacts with the transmitter 405, causing the transmitter 405 to generate and transmit the RF signal pulse.

As shown by block 506 of FIG. 5, after transmitting the RF signal pulse, the process again repeats at block 502. In other words, the primary beacon transmitter 104 continuously generates an RF signal pulse once every pulse period duration while it is operational.

Figure 6:
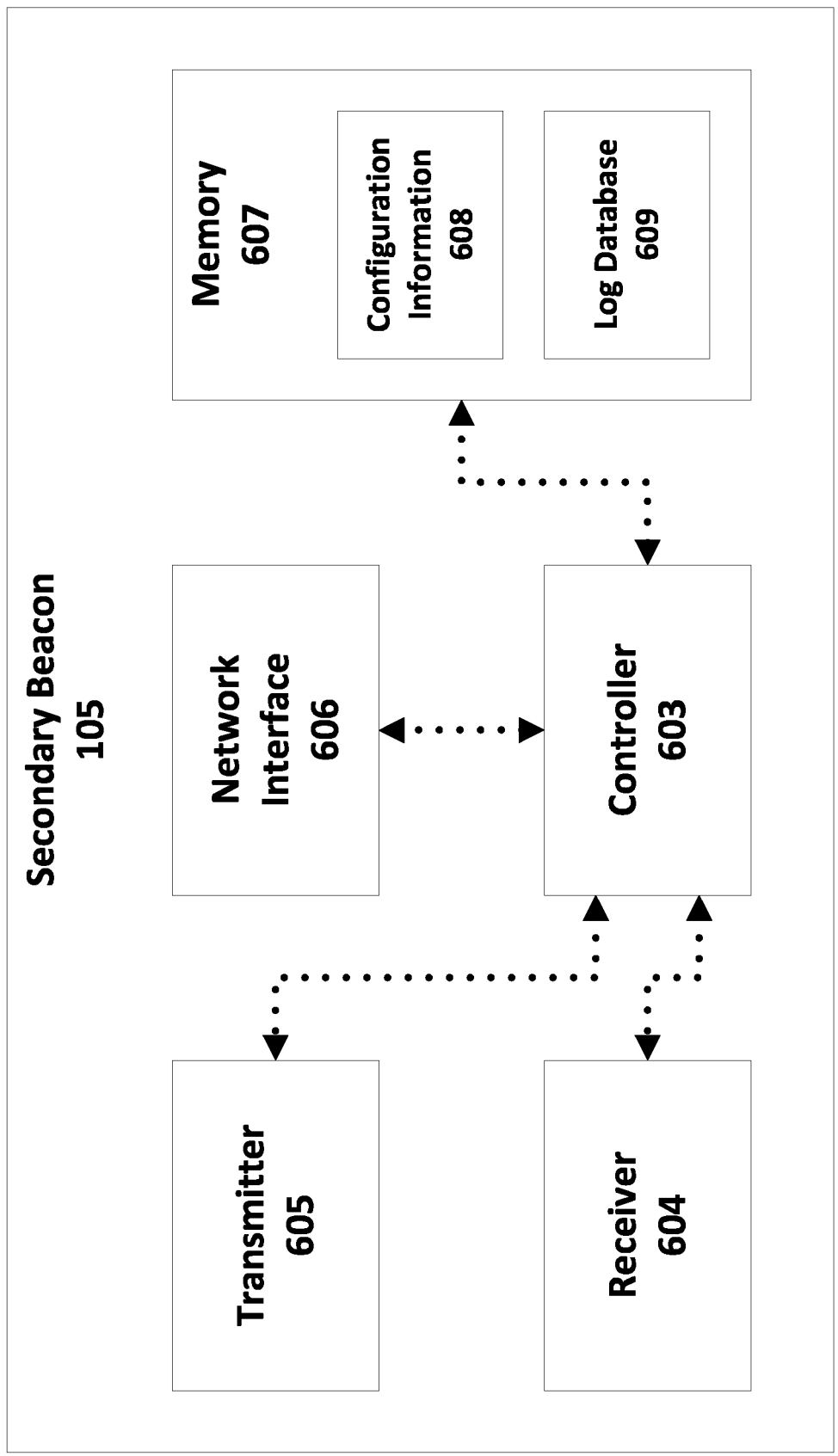
FIG. 6 is a block diagram of a secondary beacon transmitter, such as is depicted by FIG. 1.

FIG. 6 shows a block diagram of a secondary beacon transmitter 105, in accordance with an exemplary embodiment of the present disclosure. As shown by the figure, a secondary beacon transmitter 105 may comprise a controller 603, a transmitter 605, and a receiver 604. The controller 603 may control the various components of the secondary beacon transmitter 105 to orchestrate the functioning of the beacon transmitter. The transmitter 605 may generate and emit an RF signal pulse. Similarly, the receiver 604 may receive and record (e.g. by taking several measurements of) an RF signal pulse. In general, the received RF signal pulse may be composed of multiple sub-signals (e.g., multiple sub-signal pulses) that combine to form the overall received RF signal pulse. In the simplest case, the received RF signal pulse may be composed of a single sub-signal. Likewise, the transmitted RF signal pulse may be composed of multiple sub-signals (e.g., multiple sub-signal pulses) that combine to form the overall transmitted RF signal pulse. In the simplest case, the transmitted RF signal pulse may be composed of a single sub-signal.

More precisely, the controller 603 is connected to the transmitter 605 and the receiver 604. The controller 603 may interact with the transmitter 605 to cause the transmitter 605 to generate and emit an RF signal pulse. The controller 603 may also interact with the receiver 604 to cause the receiver 604 to record an RF signal pulse currently being received by the receiver 604. The controller 603 may then obtain the recorded RF signal pulse from the receiver 604 (or may obtain the measurements of the RF signal pulse from the receiver 604), which it can use for various purposes (e.g., having the transmitter 605 generate and emit a corresponding RF signal pulse).

The secondary beacon transmitter 105 may also comprise a memory 607 that is connected to and editable by the controller 603. The memory 607 may store, among other things, configuration information 608 and log database 609. The configuration information 608 may contain information indicating various parameters of the secondary beacon transmitter 105, such as its assigned primary beacon transmitters 104 or its turnaround time duration. The log database 609 may contain logs recorded by the controller 603 about the operation of the secondary beacon transmitter 105. These logs could include things such as operational anomalies, ambient conditions around the secondary beacon transmitter 105, and the like.

The secondary beacon transmitter 105 may also comprise a network interface 606 that is connected to the controller 603 and used to communicate with the controller 103 of the geo-positioning system 102. The network interface 606 can be used to obtain changes to the configuration of the secondary beacon transmitter 105 (e.g., changes to configuration information 608) from the controller 103 and to report various stored logs (e.g., from log database 609) to the controller 103.

In operation, the secondary beacon transmitter 105 works by having the controller 603 monitor the receiver 604 to determine when an RF signal pulse is detected. Once an RF signal pulse is detected, the detected RF signal pulse may be recorded. Specifically, once the RF signal pulse is detected, the controller 603 interacts with the receiver 604 to cause the receiver 604 to measure (and record the measurements) of the incoming RF signal pulse. The controller 603 then obtains a record of the received RF signal pulse. In some embodiments, the receiver 604 may itself use these measurements of the received radio-frequency pulse to determine the parameters of the received RF signal pulse, which it then provides to the controller 603. In other embodiments, the controller 603 may obtain the measurements of the RF signal pulse from the receiver 604 and then use these measurements itself to determine the parameters of the received RF signal pulse.

Once the controller 603 obtains the record of the received RF signal pulse, the received RF signal pulse may be re-transmitted. Specifically, the controller 603 interacts with the transmitter 605 to cause the transmitter 605 to generate and emit the recorded RF signal pulse (which should correspond to the received RF signal pulse). In some embodiments, the secondary beacon transmitter 105 may have an associated identifier (e.g., ID number) that uniquely identifies the secondary beacon transmitter 105. In this case, the generated RF signal pulse may encode the identifier associated with the secondary beacon transmitter 105. If the RF signal pulse already has an encoded identifier associated with the primary beacon transmitter 104 that initially generated the RF signal pulse, the secondary beacon transmitter's associated identifier may be encoded in a way that does not corrupt the already encoded primary beacon transmitter's identifier.

Note that, in general, the transmitter 605 comprises an antenna which is used to convert an electrical signal into a corresponding wireless RF signal pulse. In the simplest case, this antenna may be omnidirectional (e.g., transmitting equally in all directions). In some embodiments, however, the antenna may be directional. This may be used, for example, to overcome adverse geographical features or to extend an RF signal pulse further in a specific direction. Similarly, the receiver 604, in general, comprises an antenna which is used to convert an incoming RF signal pulse into a corresponding electrical signal. In the simplest case, this antenna may be omnidirectional (e.g., transmitting equally in all directions). In some embodiments, however, the antenna may be directional. This may be used, for example, to overcome adverse geographical features or to extend the detection range for an RF signal pulse further in a specific direction.

In some embodiments, a secondary beacon transmitter 105 may be assigned to only the primary beacon transmitter 104 whose associated area it is in. If the secondary beacon transmitter 105 happens to be in the core area of a primary beacon transmitter, then the secondary beacon transmitter 105 to only that primary beacon transmitter. Otherwise, if the secondary beacon transmitter 105 is in the handover region of a primary beacon transmitter, it may be assigned to the two or more primary beacon transmitters associated with the area. In either case, if a secondary beacon transmitter 105 is assigned to particular primary beacon transmitters 104, the secondary beacon transmitter 105 may only re-transmit RF signal pulses transmitted from that beacon transmitter.

The controller 603 may be implemented in hardware or a combination of hardware and software. As an example, the controller 603 may comprise one or more field programmable gate arrays (FPGAs) or one or more application-specific integrated circuits (ASICs). In some embodiments, the controller 603 may comprise one or more processors (e.g., central processing units (CPUs) or microprocessors) programmed with software that when executed by the processor cause the processor to perform the functions described herein for the controller 603. In other embodiments, other configurations of the controller 603 are possible.

In some embodiments, some or all of the functionality of a secondary beacon transmitter 105 may be provided through a digital radio-frequency memory (DRFM) subsystem. Typically a DRFM system (e.g., a DRFM subsystem), digitizes an incoming (analog) radio-frequency input signal (e.g., an incoming RF signal pulse). A DRFM system may accomplish this by sampling the incoming RF input signal at a sufficient frequency (i.e., a sufficient sampling rate) to avoid distortion (e.g., aliasing). Generally speaking, this means sampling the incoming radio-frequency input signal at or above the signal's Nyquist rate (i.e., sampling the incoming RF input signal with a sampling rate twice as large (or larger) than the incoming RF input signal's highest frequency component). These samples can be used to determine the parameters of the incoming radio-frequency input signal, which can be stored digitally. This digital copy of the incoming radio-frequency input signal can then be modified through various digital operations and can be used to generate and transmit (e.g., by using the transmitter 605) a copy of the radio-frequency input signal or a modified copy of the radio-frequency input signal. In this case, a DRFM may comprise portions of both the controller 603 and the receiver 604.

Figure 7:
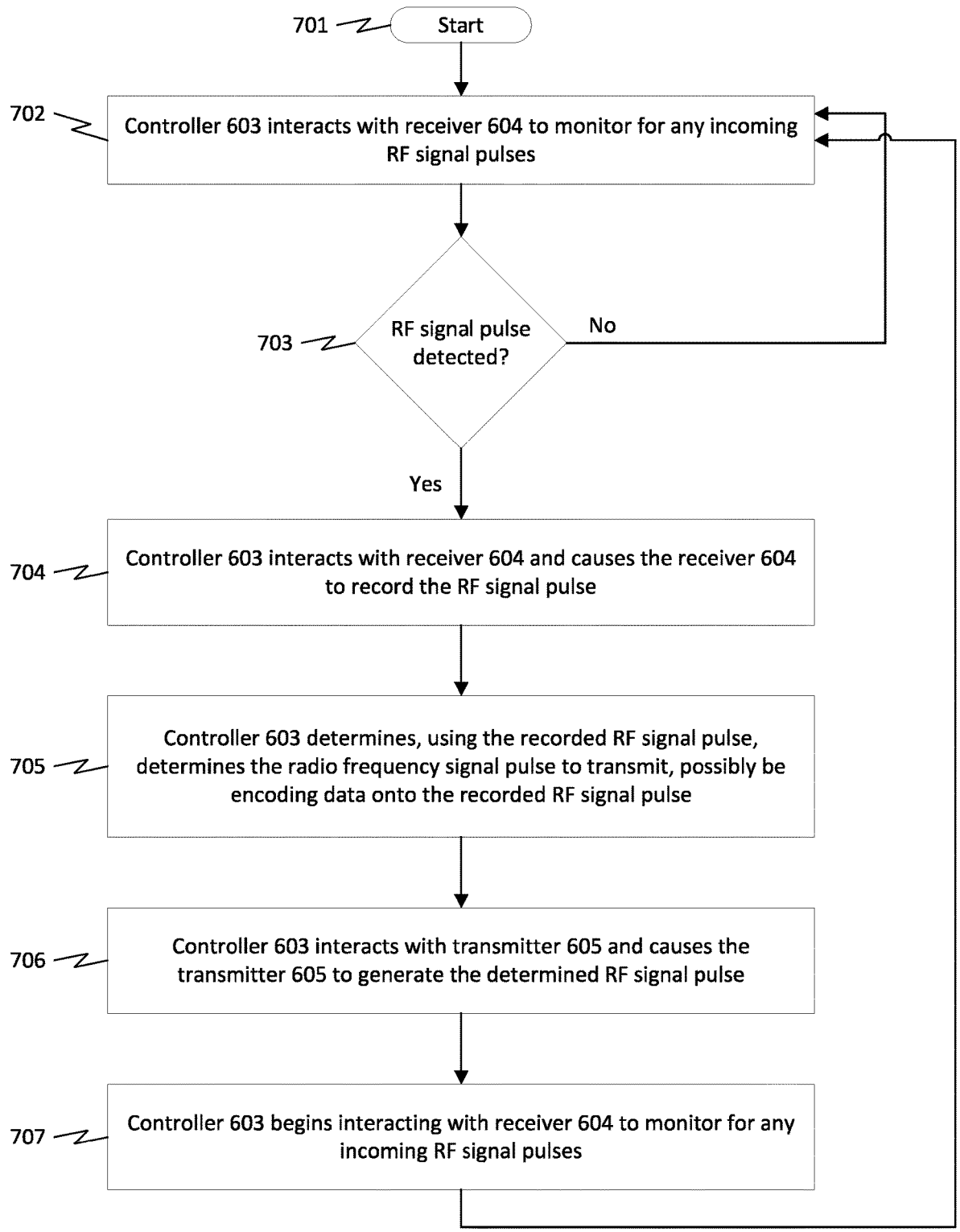
FIG. 7 is a flowchart illustrating the operation of a secondary beacon transmitter.

FIG. 7 is a flowchart illustrating the operation of a secondary beacon transmitter, such as was described in block 303 of FIG. 3.

To start, as shown by block 702 of FIG. 7, the secondary beacon transmitter 105 monitors for any incoming RF signal pulses. More precisely, the controller 603 interacts with the receiver 604 causing the receiver 604 to monitor for any incoming RF signal pulses. As discussed below, in some embodiments, the secondary beacon transmitters 105 are assigned to specific primary beacon transmitters. In this case, a secondary beacon transmitter 105 may only monitor for incoming RF signal pulses from its respective assigned primary beacon transmitters.

As shown by block 703 of FIG. 7, the controller 603 determines if an RF signal pulse has been detected. If the controller 603 determines that an RF signal pulse has not been detected, the process repeats at block 702 (i.e., the controller 603 continues to monitor for incoming RF signal pulses). On the other hand, if the controller 603 determines that an RF signal pulse has been detected, the process proceeds to block 704.

When an RF signal pulse is detected, as shown by block 704 of FIG. 7, the secondary beacon transmitter 105 records the RF signal pulse. Specifically, the controller 603 interacts with the receiver 604, causing the receiver 604 to record the RF signal pulse being received. The controller 603 then obtains the recorded RF signal pulse from the receiver 604. Ideally, the recorded RF signal pulse is identical to the received RF signal pulse.

Once the RF signal pulse has been recorded, as shown by block 705 of FIG. 7, the secondary beacon transmitter 105 determines what radio-frequency signal to generate and retransmit. Principally, the secondary beacon transmitter 105 will default to transmitting an RF signal pulse that is (ideally) identical to the recorded RF signal pulse (i.e., re-transmitting the recorded RF signal pulse). In some cases, the secondary beacon transmitter 105 will modify the default RF signal pulse to encode information.

For example, in some embodiments the controller 603 may modify the recorded RF signal pulse to encode information indicating the identity of the re-transmitting secondary beacon transmitter 105. In general, any suitable modulation method may be used to encode information into the RF signal pulse. For example, the controller 603 could use amplitude modulation (AM) to superimpose a data signal over the recorded RF signal pulse. From a discrete point of view, this involves slightly modifying the amplitude of the recorded RF signal pulse (i.e., increasing or decreasing the amplitude) based on whether the data signal encodes (for a binary data signal) a 0 or 1 (e.g., increasing the amplitude when the data signal is a 1 and decreasing the amplitude when the data signal is a 0). As another example, if the recorded RF signal pulse comprises two orthogonal sub-signals, the controller 603 could use quadrature amplitude modulation (QAM) to encode information (e.g., information indicating the identity of the controller 603). In some embodiments, the controller 602 may also modify the recorded RF signal pulse to encode information indicating the turnaround-time of the controller 603.

As shown by block 706 of FIG. 7, after the secondary beacon transmitter 105 determines an RF signal pulse to transmit, the determined RF signal pulse is wirelessly transmitted. More precisely, the secondary beacon transmitter 105 interacts with the transmitter 605, causing the transmitter 605 to generate and transmit the determined RF signal pulse.

As shown by block 707 of FIG. 7, after transmitting the RF signal pulse, the process again repeats at block 702. In other words, the secondary beacon transmitter 105 continuously monitors for and retransmits incoming RF signal pulses while it is operational.

As mentioned above, a properly configured locating receiver can, within the service area of the geo-positioning system 102, use the RF signal pulses to determine its location. At a high level, this involves the configured receiver detecting an RF signal pulse and its retransmissions from at least a minimum number of beacon transmitters (typically either zero or one primary beacon transmitter with secondary beacon transmitters comprising the remainder). Typically, the minimum number of RF signal pulses needed to determine a 3D location is four, though this number drops to three if another source is used to determine one of the location parameters (e.g. a radar altimeter being used to determine elevation). However, depending on the multilateration technique being used, more than the minimum number of RF signal pulses to refine the location determination. The identity of the transmitting and re-transmitting beacon transmitters is then determined and a stored database of beacon transmitter information is used to adjust the recorded arrival times of the RF signal pulses at the locating receiver. These adjusted arrival times can then be processed using a multilateration technique or other type of position-determining technique to determine the locating receiver's position relative to the beacon transmitters that transmitted the RF signal pulses.

To some extent, the minimum capabilities (e.g., processing power) of a receiver depend on the parameters of the geo-positioning system being used. For example, if the geo-positioning system encodes the identifier for the primary beacon transmitter into the transmitted RF signal pulse and the identifier for the secondary beacon transmitter into the re-transmitted RF signal pulse, the complexity of the locating receiver may be reduced. In particular, the presence of the identifiers may allow the locating receiver to utilize an omnidirectional antenna to receiver the RF signal pulses. Otherwise, a direction finding (DF) antenna may be used to determine the relative direction of the incoming RF signal pulses which, based on a stored database of beacon transmitter information (particular beacon transmitter location information), may be processed to determine the primary and/or secondary beacon transmitters from which the incoming RF signal pulses originated.

Figure 8:
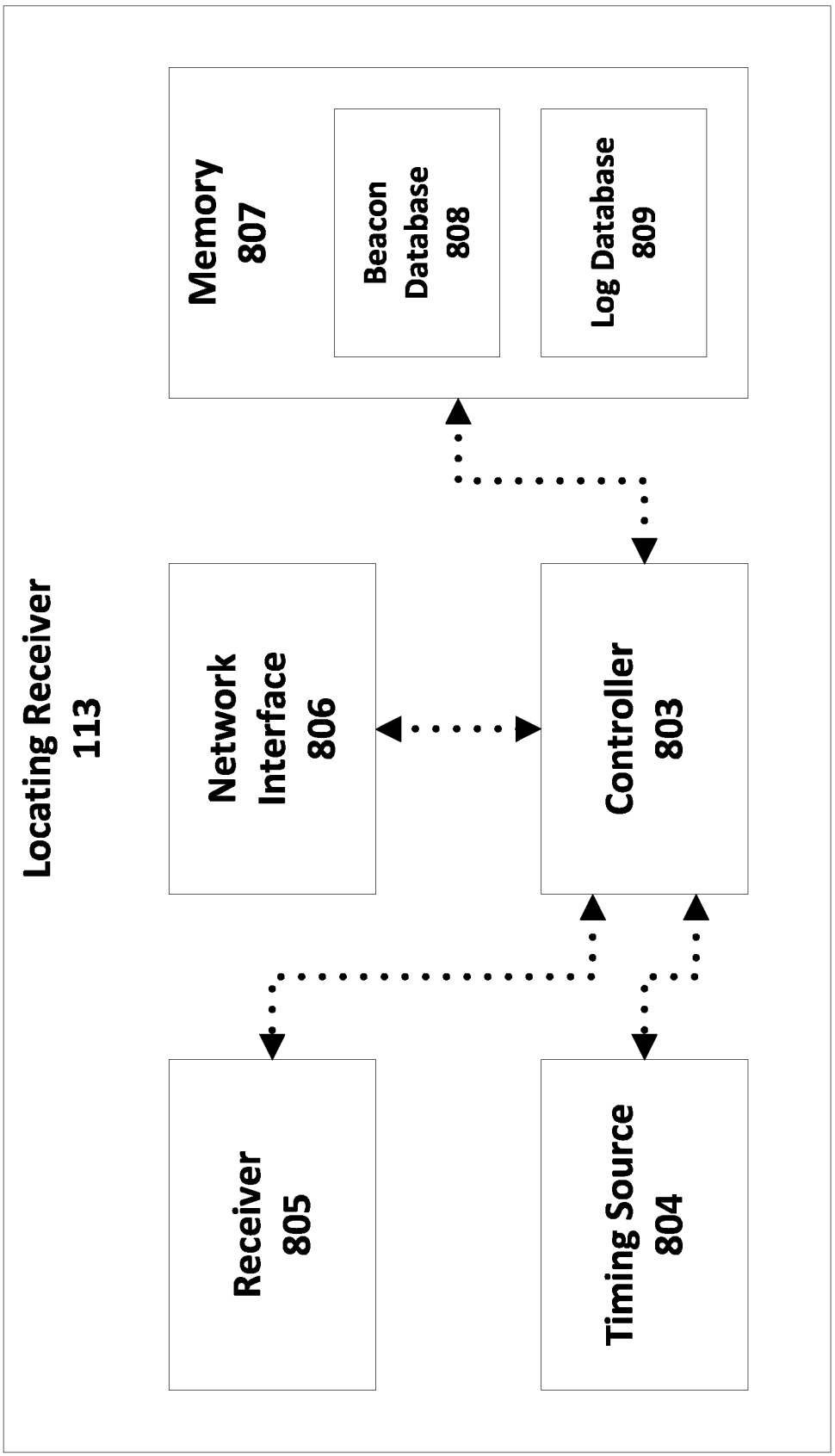
FIG. 8 is a block diagram of a locating receiver.

FIG. 8 shows a block diagram of a locating receiver, in accordance with an exemplary embodiment of the present disclosure. As shown by the figure, a locating receiver 113 may comprise a controller 803, a memory 807, a timing source 804, a receiver 805, a network interface 806, and a memory 807. The controller 803 may control the various components of the locating receiver 113 to orchestrate the functioning of the locating receiver. The timing source 804 may generate a timing signal that can be used to track the passage of time. The receiver 805 may receive and record (e.g. by taking several measurements of) an RF signal pulse. The network interface 806 can be used by the controller 803 to obtain information from and provide information to (through the network interface 106) the controller 103 of geo-positioning system 102. The memory 807 may store information, including a beacon transmitter database 808 and a log database 809.

In general, the received RF signal pulse may be composed of multiple sub-signals (e.g., multiple sub-signal pulses) that combine to form the overall received RF signal pulse. In the simplest case, the received RF signal pulse may be composed of a single sub-signal. Likewise, the transmitted RF signal pulse may be composed of multiple sub-signals (e.g., multiple sub-signal pulses) that combine to form the overall transmitted RF signal pulse. In the simplest case, the transmitted RF signal pulse may be composed of a single sub-signal.

More precisely, the controller 803 is connected to the timing source 804 and the receiver 805. The controller 803 may receive from the timing source 804 an oscillating signal with a stable frequency, which the controller 803 can use to measure the passage of time. The controller 803 may interact with the receiver 805 to cause the receiver 805 to record any RF signal pulses that arrive at the receiver 805 during a reception interval. The controller 803 may then obtain the recorded RF signal pulses from the receiver 805 (or may obtain the measurements of the RF signal pulses from the receiver 805), which it can use for further processing and/or, ultimately, to determine the relative location of the receiver controller 113.

The pre-stored database 808 comprises a location database of the relative location of the primary and secondary beacon transmitters. In particular, the location database may contain information indicating the position of each of the primary and secondary beacon transmitters. This information may be encoded in and stored as a variety of coordinate systems. For example, the location database may use a spherical coordinate system, meaning it lists the latitude, longitude, and elevation of each of the primary and secondary beacon transmitters. The relative position of the beacon transmitters from one another can be used to determine the relative distance between the beacon transmitters. In particular, it can be used to determine the distance between a primary beacon transmitter and a re-transmitting secondary beacon transmitter. The pre-stored database 808 may also comprise a turnaround time dataset of the turnaround times of the various secondary beacon transmitters 105.

The memory 807 is typically connected to and editable by the controller 803. As mentioned above, the memory 807 may store, among other things, beacon transmitter database 808 and log database 809. The beacon transmitter database 808 may contain information indicating the (geographic) position of each of the primary and secondary beacon transmitters. This information may be encoded in and stored as a variety of coordinate systems. For example, the central beacon transmitter database 108 may use a spherical coordinate system, meaning it lists the latitude, longitude, and elevation of each of the primary and secondary beacon transmitters. The beacon transmitter database 808 may also contain information indicating the turnaround times of the various secondary beacon transmitters 105. The log database 809 may contain logs recorded by the controller 803 about the operation of the locating receiver 113. These logs could include things such as detected positional anomalies and the like. The network interface 806 may be used to obtain the beacon transmitter database 808 from the geo-positioning system 102 and may be used to send various logs (e.g., from log database 809) to the controller 103.

In operation, the locating receiver 113 works by having the controller 803 monitor the receiver 805 to determine when an RF signal pulse is detected. Once an RF signal pulse is detected, the detected RF signal pulse may and its time of arrival may be recorded. Specifically, once the RF signal pulse is detected, the controller 803 interacts with the receiver 805 to cause the receiver 805 to measure (and record the measurements) of the incoming RF signal pulse. Separately, the controller 803 may use the oscillating signal from the timing source 404 to determine an accurate time of arrival for the detected RF signal pulse. The controller 803 then obtains a record of the received RF signal pulse. The receiver controller 803 may repeat this process for any RF signal pulses received during a reception interval. In some embodiments, the receiver 805 may itself use these measurements of the received radio-frequency pulse to determine the parameters of the received RF signal pulse, which it then provides to the controller 803. In other embodiments, the controller 803 may obtain the measurements of the RF signal pulse from the receiver 805 and then use these measurements itself to determine the parameters of the received RF signal pulse.

Once the controller 803 obtains the record of the received RF signal pulses, the received RF signal pulses may be used to determine the location of the locating receiver 113.

Note that, in general, the receiver 805 comprises an antenna which is used to convert an incoming RF signal pulse into a corresponding electrical signal. In the simplest case, this antenna may be omnidirectional (e.g., transmitting equally in all directions). In some embodiments, however, the antenna may be directional. This may be used, for example, to overcome adverse geographical features or to extend the detection range for an RF signal pulse further in a specific direction.

In terms of technology, the timing source 804 may be any variety of devices with sufficient enough resolution (i.e., large frequency) and sufficient precision (i.e., stable frequency) to consistently have the measured relative time of arrival between the RF signal pulses measured during one measurement interval be within 100 microsecond of the true relative time of arrival between the RF signal pulses.

The controller 803 may be implemented in hardware or a combination of hardware and software. As an example, the controller 803 may comprise one or more field programmable gate arrays (FPGAs) or one or more application-specific integrated circuits (ASICs). In some embodiments, the controller 803 may comprise one or more processors (e.g., central processing units (CPUs) or microprocessors) programmed with software that when executed by the processor cause the processor to perform the functions described herein for the controller 803. In other embodiments, other configurations of the controller 803 are possible.

Figure 9:
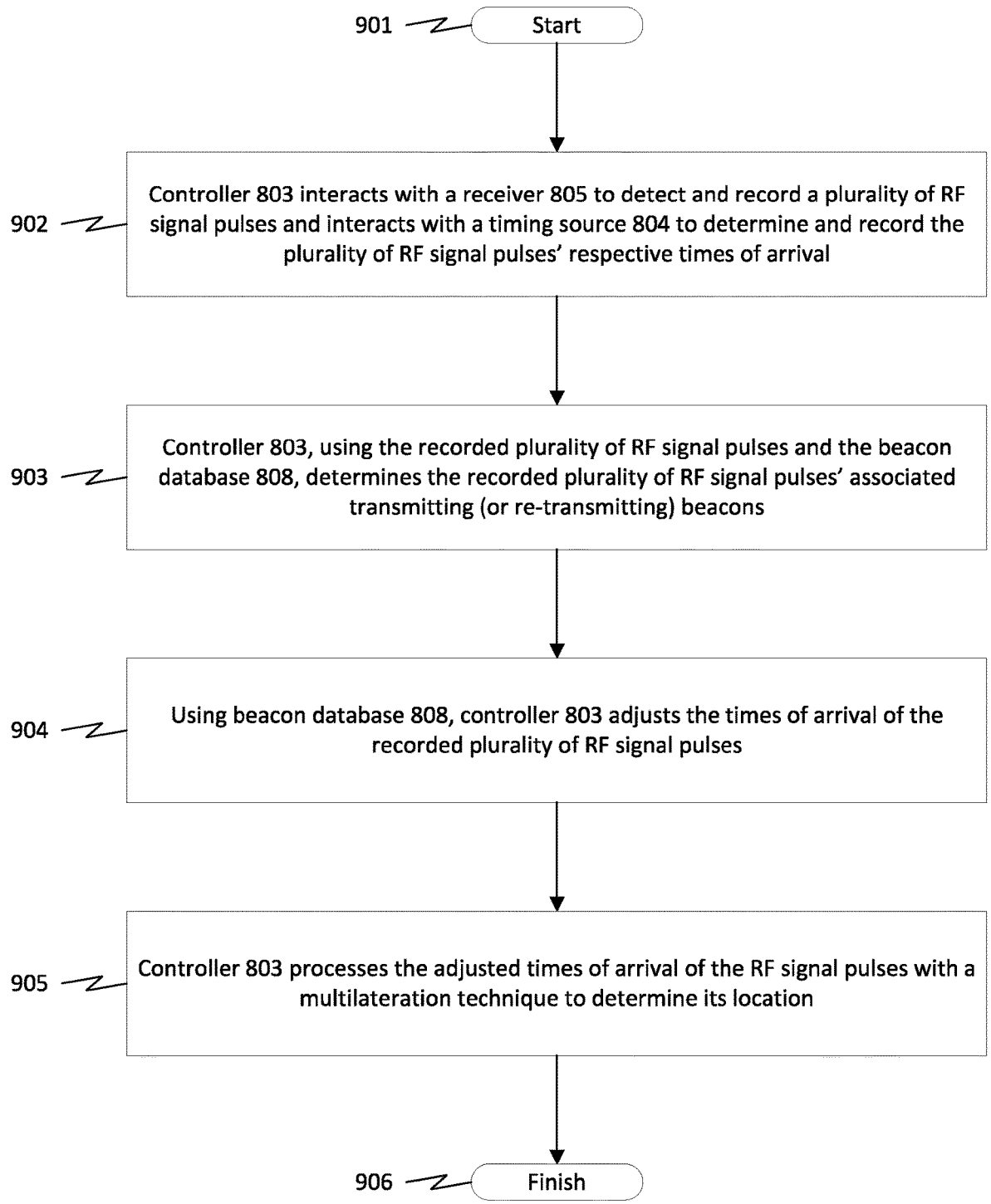
FIG. 9 is a flowchart illustrating the process of a locating receiver determining its location using radio-frequency signals, such as those discussed in FIG. 3.

FIG. 9 is a flowchart illustrating the process of a locating receiver determining its location using RF signal pulses, such as those discussed in FIG. 3.

To start, as shown by block 902 of FIG. 9, the controller 803 detects and records a plurality of RF signal pulses and their respective times of arrival. More precisely, the controller 803 interacts with the receiver 805 causing the receiver 805 to monitor for any incoming RF signal pulses. When an incoming RF signal pulse is detected, the controller 803 may interact with the receiver 805, causing the receiver 805 to record the RF signal pulse being received. The controller 803 then obtains the recorded RF signal pulse from the receiver 805. Ideally, the recorded RF signal pulse is identical to the received RF signal pulse. In parallel, when an incoming RF signal pulse is detected, the controller 803 may also interact with the timing source 804 to determine a time of arrival and record this information along with the incoming RF signal pulse.

Generally speaking, this process occurs for any RF signal pulse received during a reception interval (i.e., the time period during which the controller 803 waits to acquire any available RF signal pulses resulting from the transmission of an RF signal pulse from a primary beacon transmitter 104 and its associated re-transmissions from secondary beacon transmitters 105). Ideally, the reception interval should be long enough to receive the RF signal pulse from a primary beacon transmitters and any re-transmissions of that RF signal pulse from any re-transmitting secondary beacon transmitters.

Note that, in some cases, two pulses may overlap with one another, creating a pulse-on-pulse collision. In this case, the controller 803 may discard both pulses. In cases where significantly more RF signal pulses than a minimum threshold are received, the, the controller 803 may discard the colliding pulses and still have at least a minimum threshold of (non-overlapping) RF signal pulses. The controller 803 may then select a desired amount of RF signals from these remaining, non-discarded RF signal pulses. Otherwise, if there is only an insufficient number of RF signal pulses remaining after discarding colliding pulses (e.g., because of numerous pulse-on-pulse collisions), the controller 803 may wait until the next series of pulses arrive. Waiting for the next series of RF signal pulses often resolves instances of pulse collisions because the time between reception intervals, combined with the typical fast movement speed of the locating receiver 113 (e.g., from being part of a moving aircraft), often changes the relative distances the overlapping RF signal pulses must travel by an amount sufficient to alter their relative arrival time such that they no longer overlap with one another when received by the locating receiver 113.

After detecting the plurality of RF signal pulses and recording their times of arrival, as shown by block 903 of FIG. 9, the controller determines the primary and secondary beacon transmitters associated with (i.e., that transmitted (or retransmitted)) each of the received plurality of RF signal pulses.

After determining the beacon transmitter associated with each of the received plurality of RF signal pulses, as shown by block 904 of FIG. 9, the controller may adjust the times of arrival associated with each of the received plurality of RF signal pulses using the beacon transmitter database 808. In particular, the controller 803 may use the identity of the beacon transmitters associated with the received plurality of RF signal pulses to determine, for any secondary beacon transmitters 105, the beacon transmitters' turnaround times and relative distance from the primary tower which originally generated the RF signal pulse. This information can then be used to adjust the recorded arrival times of the received plurality of RF signal pulses. Specifically, it can be used to account for the different transmission times of the secondary beacon transmitters 105. One cause of this difference is the different times of arrival of the RF signal pulse generated by the primary beacon transmitter 104 that is caused by secondary beacon transmitters 105 having varying distances from the primary beacon transmitter 104 (e.g., different speed of light delays). Another cause of this difference is the different amount of time taken by the secondary beacon transmitters 105 to re-transmit the received RF signal pulse after having finished receiving it (i.e., the secondary beacon transmitters' turnaround times). Essentially, these corrections make it so that the times of arrival of the RF signal pulses can be treated as if they were transmitted simultaneously.

Before adjusting the times of arrival associated with the received plurality of RF signal pulses, the controller 803 may determine which of the received plurality of RF signal pulses will be used to determine the location of the locating receiver. If using the minimum number of RF signal pulses, the ideal case (all else being equal) is for the originating direction of the RF signal pulses (i.e., the primary or secondary beacon transmitter location from which the RF signal pulses were transmitted) to be equally and maximally separated from the perspective of the locating receiver 113. For example, if three RF signal pulses are selected, the ideal scenario is that the angle between the RF signal pulses is 120 degrees. The controller 803 may select the three RF signal pulses from the received plurality of RF signal pulses based on which set of RF signal pulses best approaches this ideal. In some embodiments, the controller 803 may deliberately rotate between received RF signal pulses (or some subset of them). A benefit of this approach may be to average out any errors caused by specific secondary beacon transmitters 105.

To determine which RF signal pulses to select, the controller 803 may determine the direction the various RF signal pulses were received from. More precisely, the controller 803 may use the determined identity of the beacon transmitters associated with the RF signal pulses to determine the location from which the RF signal pulses originated (e.g., were transmitted from). Specifically, the controller 803 may determine the location of the associated beacon transmitter using the beacon transmitter database 808 and use this location as the location from which a RF signal pulse associated with the particular beacon transmitter originated. The controller 803 may then compare the origin locations of the RF signal pulses with a rough estimation of the locating receiver's position (e.g., the rough position of the airplane or other vehicle the locating receiver 113 is integrated into) to determine the angle of arrival of the various RF signal pulses relative to the locating receiver. Using this information, the controller 803 may compare various combinations of RF signal pulses and select a combination based on the relative spacing of the RF signal pulses.

After adjusting the times of arrival associated with each of the received plurality of RF signal pulses, as shown by block 905 of FIG. 9, the beacon transmitter controller 803 may process the adjusted times of arrival to determine its location. Specifically, the controller 803 may process the adjusted times of arrival using a multilateration algorithm. The output of the multilateration algorithm may be the location of the locating receiver relative to the beacon transmitters associated with the RF signal pulses associated with the processed times of arrival. The controller 803 may use the information about its positioning relative to these beacon transmitters and the information stored in beacon transmitter database 808 about the absolute positon of these beacon transmitters (e.g., the beacon transmitter's longitude, latitude, and elevation) to determine its own absolute positon (e.g., the locating receiver's longitude, latitude, and elevation).

As previously alluded to, a locating receiver 102 is able to determine its location using the various RF signal pulses by exploiting certain known information about the RF signal pulses. As background, a receiver can determine its location (e.g., by using a multilateration algorithm), using only the times of arrival of various signals (e.g., an RF signal pulse). In general, however, this is only possible if the various signals have two important properties: the signals must be transmitted simultaneously and must propagate at a constant speed. This enables the (differences between) the times of arrival of the various signals to be used to ascertain the receivers positon relative to the signals' points of origin and, if the geographic location of the signals' points of origin are known, to ascertain the receivers absolute geographic positon.

However, as discussed above, the RF signal pulses of the geo-positioning system 102 are not necessary transmitted simultaneously. Rather, the RF signal pulses generated by the various secondary beacon transmitters 105 depend upon their distance from the primary beacon transmitter (e.g., from speed of light delay) 104 and their respective turnaround times. Fortunately, however, if the distances between the secondary beacon transmitters 105 and the primary beacon transmitters 104 are known, the time of arrival of an RF signal pulse from a secondary beacon transmitter 105 can be adjusted to what it would have been if the original RF signal pulse from the associated primary beacon transmitter 104 had been instantaneously received by the secondary beacon transmitter 105. In other words, as if the travel time of the RF signal pulse from the primary beacon transmitter 104 to the secondary beacon transmitter 105 was instantaneous (e.g., as if there was no speed of light delay, or, equivalently, as if the speed of light was (effectively) infinite). Mechanistically, the time of arrival of an RF signal pulse can be adjusted backwards (in time) by an amount equal to the distance between the secondary beacon transmitter 105 and the associated primary beacon transmitter 104 multiplied by the speed of the RF signal pulse (e.g., the speed of light).

Similarly, if the turnaround times of the secondary beacon transmitters 105 are known, the time of arrival of an RF signal pulse from a secondary beacon transmitter 105 can be adjusted to what it would have been if the re-transmitted RF signal pulse had begun being re-transmitted instantaneously with the RF signal pulse from the associated primary beacon transmitter 104 beginning to be received. In other words, as if the secondary beacon transmitter 105 could simultaneously receive and (re-)transmit the RF signal pulse with no time delay between receiving a part of the RF signal pulse and that part being re-transmitted (e.g., as if there was no turnaround time). Mechanistically, the time of arrival of an RF signal pulse can be adjusted backwards (in time) by an amount equal to the turnaround time of the secondary beacon transmitter 105.

Together, these two adjustments to the time of arrival of an RF signal pulse from a secondary beacon transmitter give the time of arrival of the signal that would have occurred if the RF signal pulse from the secondary beacon transmitter was emitted simultaneously with the RF signal pulse from the primary beacon transmitter. And if this process is done for all times of arrival of RF signal pulses from the various secondary beacon transmitters, then the adjusted times of arrival of the RF signal pulses are, collectively, what the times of arrival would have been if all the RF signal pulses from the secondary beacon transmitters (and one primary beacon transmitter) were emitted simultaneously.

To enable these adjustments, a receiver (e.g., the locating receiver 102) may need to be able to determine the primary beacon transmitter 104 and secondary beacon transmitter 105 associated with a received RF signal pulse. The receiver may also need to know the distances between the beacon transmitters and the turnaround times of the secondary beacon transmitters 105 to make the adjustments just described. For example, the information stored in beacon database 808 described in FIG. 8.

As is relevant here, differences between the recorded locations of the beacon transmitters 104 and 105 and their actual locations may affect the accuracy of the location determined by a locating receiver 102. Similarly, differences between the recorded turnaround times of the secondary beacon transmitters 105 and their actual locations may affect the accuracy of the location determined by a locating receiver 102. At a high level, these both can degrade the accuracy of the location because they result in the locating receiver either over adjusting or under adjusting the arrival time of a received RF signal pulse transmitted (or retransmitted) from the beacon transmitter whose recorded location or turnaround time is inaccurate. In turn, these mis-adjusted times of arrival make the receiver seem closer to or farther from the affected transmitter than it actually is.

The cause of the differences between the recorded parameters of a beacon transmitter (e.g., its location and turnaround time) may come from a variety of sources. For example, one such cause is measurement error. In other words, the initial measurement of the location or turnaround time of the beacon transmitter was inaccurate. Another cause is from environmental effects to the beacon transmitters. These may include temporary (and thus intermittent) effects, such as temperature induced changes to a secondary beacon transmitter's turnaround time or wind induced changes to a beacon transmitter's location (e.g., from a swaying structure). These may also include permanent effects, such as the aging, wear-and-tear, and other degradation of the physical components of a secondary beacon transmitter 105 causing its turnaround time to gradually drift for the motion of the tectonic plates causing a beacon transmitters geographic positon to shift.

In some embodiments, the geo-positioning system 102 may have the ability to detect and autonomously correct these errors, thereby improving the accuracy of a location determined using the system. In particular, the geo-positioning system 102 may have the ability to autonomously detect if there is a difference between the recorded value of a parameter associated with a beacon transmitter 104 or 105 (e.g., the beacon transmitter's location or turnaround time) and the actual value of that parameter. If this difference is detected, the geo-positioning system 102 may determine the actual value of the parameter and update the recorded value to match it. In some embodiments, the geo-positioning system 102 may generate a predicative model for the value of a parameter whose changes are determined to vary based on some environmental effect, such as the current temperature. By doing so, the geo-positioning system 102 may autonomously calibrate itself and increase the accuracy of the geographic locations determined by various locating receivers 113.

In particular, to address these issues of mis-calibration, embodiments of the present disclosure may utilize a geo-positioning system and a plurality of locating navigation systems to detect and correct positioning errors resulting from errors in the geo-positioning system's recorded data about its various components. Specifically, embodiments of the present disclosure may utilize several beacon transmitters to periodically generate and transmit (or re-transmit) RF signal pulses. Also utilized are a plurality of navigation systems, each having a locating receiver 113 that uses the transmitted RF signal pulses to determine their respective locations. The navigation systems, which may themselves be part of another system (e.g., an aircraft), may compare this determined location with a location determined through another independent means. If the two locations differ, the navigation system may log this difference and later report it to the geo-positioning system. The geo-positioning system may use these reported logs to detect and correct inaccuracies in its stored data about the beacon transmitters. Eventually, the geo-positioning system may distribute these updates to the plurality of navigation systems and their associated locating receivers 113.

Note that, in general, a navigation system may be integrated into a vehicle or other moving device (e.g., an aircraft) in order to manage various navigation related functions of the vehicle. In particular, a navigation may be used to fuse or otherwise work with location data obtained from multiple sources. For example, as discussed above, in some embodiments, a locating receiver 113 may be used to determine only longitude and latitude, with the missing coordinate, altitude, being determined separately by a radar altimeter. The navigation system (or its controller) may obtain the data longitude and latitude data from the locating receiver 113 and the altitude data from the radar altimeter 1005 and fuse this to obtain complete 3D coordinates.

Figure 10:
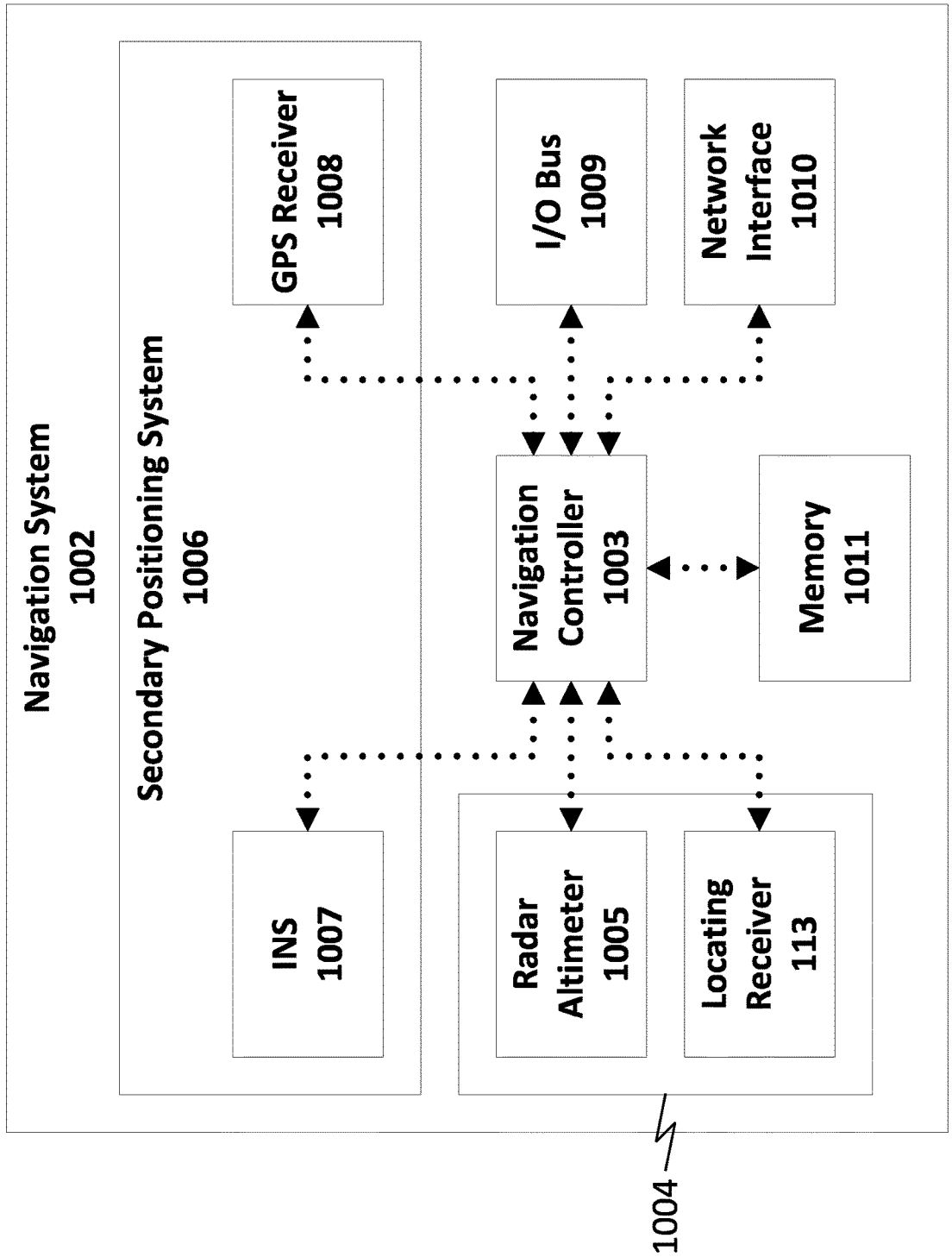
FIG. 10 is a block diagram of a navigation system, in accordance with an exemplary embodiment of the present disclosure.

FIG. 10 shows a block diagram of a navigation system 1002, in accordance with an exemplary embodiment of the present disclosure. As shown by the figure, a navigation system 1002 may comprise a navigation controller 1003, a primary positioning system 1004, a secondary positioning system 1006, an input/output (IO) bus 1009, a network interface 1010, and memory 1011. In turn, the primary positioning system 1006 may comprise a locating receiver 113 and a radar altimeter 1005. The secondary positioning system 1006 may comprise an inertial navigation system (INS) 1007 and a global positioning system (GPS) receiver 1008. The navigation controller 1003 may be used to "manage" the navigational system of the navigation system 1002 and its various components as described in more detail below. Towards this end, the navigation controller may be connected and in communication with the components of the navigation system 1002.

In particular, the navigation controller 1003 may interact with the primary navigation system 1004 and the secondary navigation system 1006 to determine the current location of the navigation system 1002. In particular, the navigation controller 1003 may interact with the primary positioning system 1004 to determine its location (i.e., a primary location estimate) and interact with the secondary positioning system 1006 to determine a second location (i.e., secondary location estimates). The primary positioning system determines the coordinate components representing its location at least partially (and in some embodiments fully) using the locating receiver 113. As shown here, the locating receiver 113 determines two of the three coordinate components (e.g., longitude and latitude) while the radar altimeter 1005 determines the third coordinate component (e.g., elevation).

The secondary positioning system 1006 likewise interacts with its components to determine (at least one) location. The secondary positioning system 1006 may have multiple fully independent positioning sub-systems that are each capable of independently determining a location, such as is shown here, with the INS 1007 and the GPS receiver 1008). In this case, the secondary positioning system 1006 may select only one positioning sub-system to generate the secondary location estimate. Alternatively, the secondary positioning system 1006 may use multiple positioning sub-systems to generate the secondary location estimate. In this case, these location estimates may be combined into one location estimate or, alternatively, can simply all be passed along to the navigation controller 1003.

The navigation controller 1003 may also interact with the primary positioning system 1004 and the secondary positioning system 1006 (or their components) for maintenance related purposes, such as to provide updated beacon transmitter information to the locating receiver 113 or to provide updated ephemeris data to the GPS receiver 1008.

The navigation controller 1003 may also interact with the I/O bus 1009 to communicate with other components of the device that the navigation system is integrated with (if the navigation system 1002 is integrated with another device). For example, if the navigation system 1002 is integrated as a component of an aircraft, the navigation controller 1003 may use the I/O bus 1009 to interact with other components of the aircraft. Similarly, the navigation controller 1003 may interact with the network interface 1010 to communicate with other devices and systems through some network. For example, the network interface 1010 could be used to access a distant device or other resource over a communication network, such as the internet, like the geo-positioning system 102 (particularly the central controller 103 of the geo-positioning system 102). In some embodiments, the functionality of the network interface 1010 may be subsumed by the I/O bus 1009 (e.g., the I/O bus 1009 is used to access a network interface component on another part of the device (e.g., aircraft) the navigation system 1002 is integrated with).

To support the functionality descried above, the navigation controller 1003 may be connected to the memory 1010, where various information is stored. This may include various instructions, location information received from the various locating components (e.g., the locating receiver 113, the radar altimeter 1005, the INS 1007, and the GPS receiver 1008), data received from I/O bus 1009 or network interface 1010, and the like. The memory may also store a log database 809, which may store logs recorded by the navigation controller 1003. These logs could include things such as detected positional anomalies and the like.

Note that, while the locating receiver 113 is described as being a component of navigation system 1002, the functions ascribed to the primary positioning system 1004 or its components (e.g., locating receiver 113) and the navigation systems 1002 may be allocated different in various embodiments of the present disclosure. For example, in some embodiments, the functions of the locating receiver 113 may be entirely performed by a navigation system 1002, with the functions of the locating receiver's controller 803, timing source 804, receiver 805, network interface 806, and memory 807 being performed by the navigation system's navigation controller 1003, timing source (not shown), receiver (not shown), network interface 1009, and memory 1011, respectively. This may be done so as to make a fully integrated navigation system, which often reduces the cost, weight, and complexity of a navigation system 1002.

As another example, in some embodiments, the navigation controller 1003 may be used to perform the steps described in FIG. 9. Essentially the controller 803 of the locating receiver 113 may be embodied by the navigation controller 1003. To the extent that the locating receiver 113 retains an independent controller, the controller may be used to perform the low level functions needed to cause the receiver 805 to receive the desired RF signal pulses.

In another example, the locating receiver 113 may assume some functions of the navigation system 1002. In particular, the locating receiver 113 may have or have access to a radar altimeter (and the navigation system 1002 may or may not have its own radar altimeter 1005), which the controller 803 of the locating receiver 113 uses to determine an altitude and fuse this data with latitude and longitude information determined using the geo-positioning system 102. Other combinations of the functions of a locating receiver 113 and a navigation system 1002 may also be used.

Figure 11:
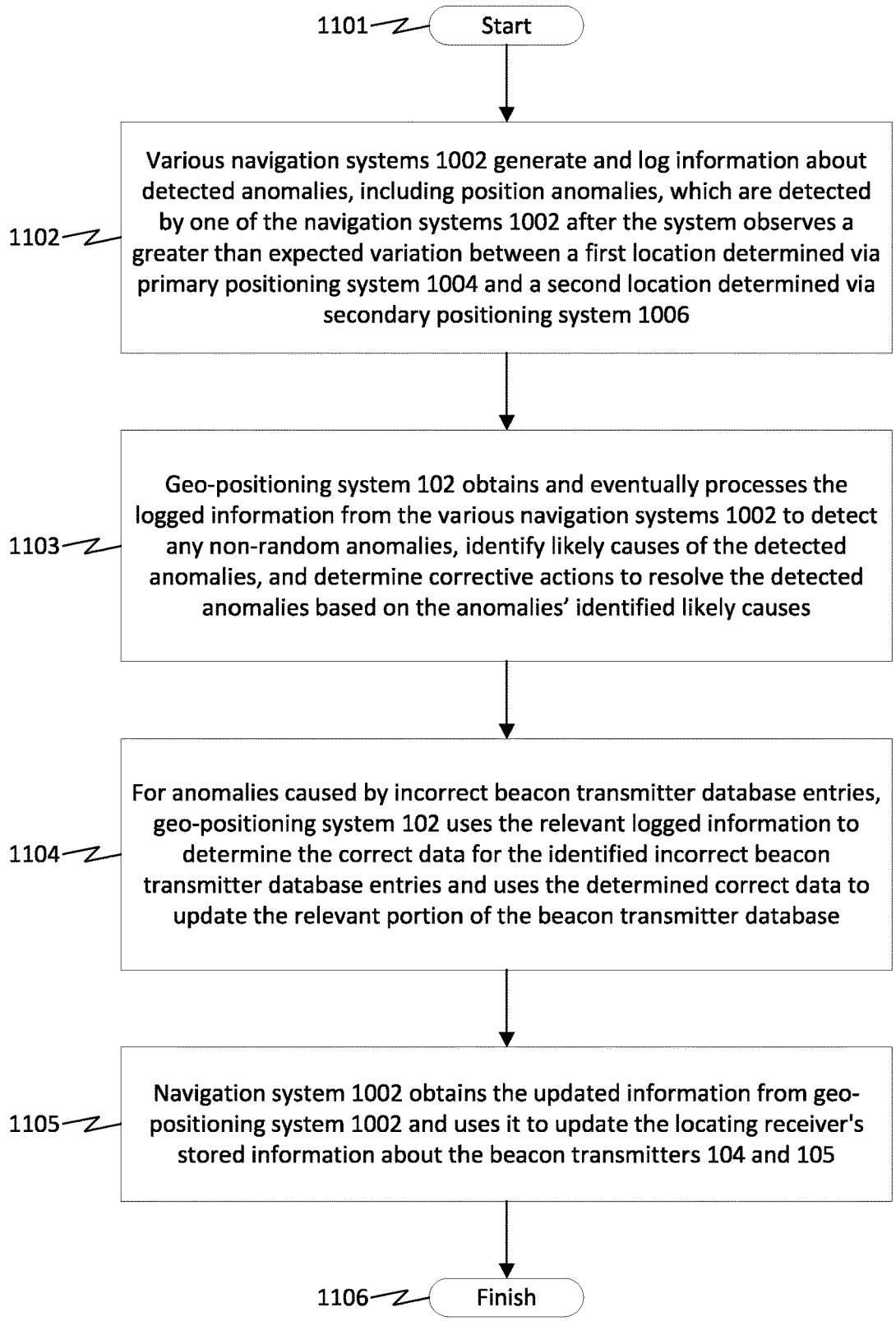
FIG. 11 is a flowchart illustrating a process of calibrating a geo-positioning system using data obtained from navigation systems.

FIG. 11 is a flowchart illustrating a process of calibrating the geo-positioning system 102 using data obtained from various navigation systems 1002, as described above.

To start, as shown by block 1102 of FIG. 11, various navigation systems 1002 generate and log information about various detected anomalies. These anomalies can be of various types, including anomalies referred to as "position anomalies." A position anomaly represents an unexpectedly large variation (i.e., greater than would be expected given the precision of the systems in question) between two locations determined by a navigation system 1002 using two separate geo-positioning systems, one of which is geo-positioning system 102. More precisely, the navigation system 1002 may determine its location twice, once via the geo-positioning system 102 (i.e., through the primary positioning system 1004) and once with a positioning system (at least partially) independent from the geo-positioning system 102 (i.e., through a component of the secondary positioning system 1006). After being generated, the navigation system 1002 may compare the difference between the two locations to determine if they differ by more than an expected tolerance. If their difference exceeds the expected tolerance, the navigation system 1002 may categorize the locations as a position anomaly and log information about the process and data used to determine the locations for further analysis and reporting.

Eventually, the navigation system 1002 may transmit the logged information to the geo-positioning system 102. In particular, the navigation system 1002 may wait to transmit the logged information until certain events occur, such as the device the navigation system 1002 is integrated with being parked. For example, for a navigation system 1002 integrated on an aircraft, the navigation system 1002 may wait until the aircraft is not in flight and is parked at a terminal. Because of the delay, the navigation system 1002 may have multiple accumulated instances of logged position anomaly information, which may all be transmitted once transmission begins.

Eventually, as shown by block 1103 of FIG. 11, the geo-positioning system 102 obtains and eventually processes the logged information from the various navigation systems 1002 to detect any non-random anomalies, identify likely causes of the detected anomalies, and determine corrective actions to resolve the detected anomalies based on the anomalies' identified likely causes. More precisely, the geo-positioning system 102, may obtain information about various detected anomalies from various navigation systems 1002. Eventually, the geo-positioning system 102 may process the various position anomalies to determine if they indicate one or more non-random anomalies. If the logged anomalies do indicate one or more non-random and non-transient irregularities in the operation of the geo-positioning system 102, the geo-positioning system 102 may use the relevant information recorded in the associated of the anomaly to determine the likely causes of the detected anomaly and, based on the determined cause, determine corresponding corrective action.

In other words, the geo-positioning system 102 may collect enough logs to verify any logged anomalies represent a true anomaly with the geo-positioning system 102 (either originating from a component of the geo-positioning system 102 or from interference with the operation of the geo-positioning system 102 by another party) rather than a random transient event or error on the part of the navigation system 1002 that generated the log. The geo-positioning system 102 may also collect enough logs to attempt to "locate" the anomaly (i.e., to attempt to determine its source) so that corrective action may be taken. For example, for a position anomaly caused by having incorrect timing information about a secondary beacon transmitter 105 stored in the central log database 109, the geo-positioning system 102 may attempt to collect enough logs to determine which secondary beacon's information is incorrect and to determine the true value of the beacon's timing information.

Based on the determined cause (or, equivalently, the determined type of the detected anomaly), the geo-positioning system 102 may take various courses of action. In particular, as shown by block 1104 of FIG. 11, for those anomalies, if any, that the geo-positioning system 102 determines are (likely) caused by position anomalies resulting from incorrect beacon transmitter database entries, the geo-positioning system may itself take corrective action by correcting the relevant database entries. Specifically, for those position anomalies that the geo-positioning system 102 determines are (likely) caused by incorrect beacon transmitter database entries, the geo-positioning system 102 uses the relevant logged information to determine the correct data for the identified incorrect beacon transmitter database entries and uses the determined correct data to update the relevant portion of the beacon transmitter database. If relevant, the navigation system 102 may eventually distribute the updated entries to the various locating receivers 113, allowing the locating receivers 113 to correct the relevant entries in their (possibly partial) copy of the central beacon database 108 (i.e., their respective beacon databases 808).

Note that the geo-positioning system 102 may take other additional corrective action for anomalies it determines are likely caused by incorrect beacon transmitter database entries. Additionally, the geo-positioning system 102 may take different corrective action for anomalies the geo-positioning system 102 determines are (likely) caused by something other than position anomalies resulting from incorrect beacon transmitter database entries. For example, for some anomalies, the geo-positioning system may flag the anomalies for human intervention. One such anomaly may be a spoofing anomaly, where the geo-positioning system determines the logged information indicates the presence of an unauthorized transmitter attempting to imitate (i.e., spoof) on the primary beacon transmitters 104 or the secondary beacon transmitters 105.

As shown by block 1105 of FIG. 11, if relevant portions of the central beacon database 108 are updated to correct detected anomalies, the navigation system 1002 eventually obtains the updated information from the geo-positioning system 102 and uses it to update the locating receiver's stored information about the beacon transmitters 104 and 105. In particular, the geo-positioning system 102 may, at some point, distribute the updated information to the various navigation systems 1002 using network interface 106 to connect with the locating receivers 113 over connections 112. These connections may be indirect. For example, the central controller 103 may connect to the navigation system 1002 (through the navigation system's network interface 1010) which then passes the relevant data to the locating receiver 113.

Figure 12:
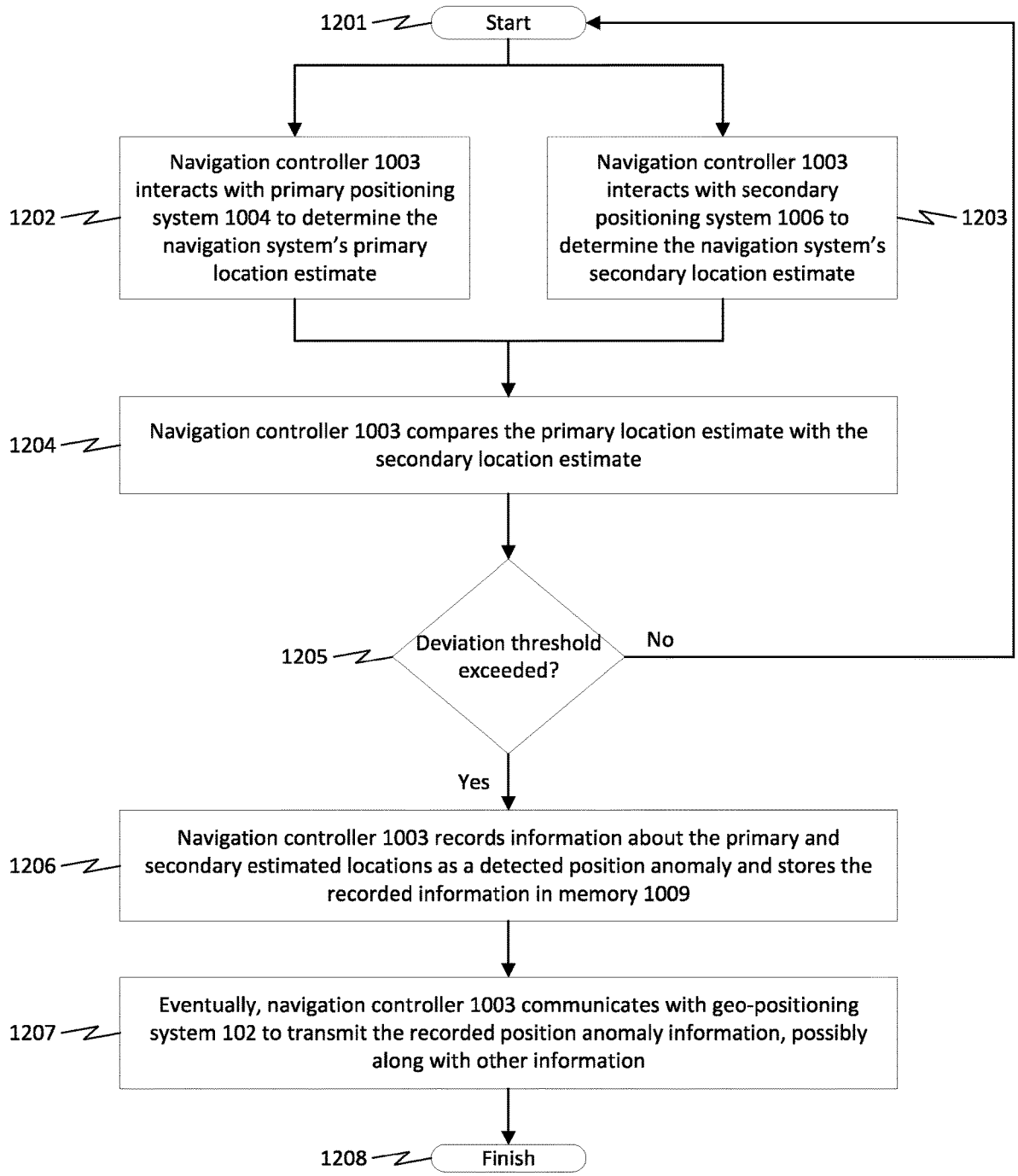
FIG. 12 is a flowchart illustrating the process of detecting, logging, and reporting a position anomaly, such as was discussed in FIG. 11.

FIG. 12 is a flowchart illustrating the detection, logging, and reporting of a position anomaly, such as was described in block 1102 of FIG. 11.

To start, as shown by block 1102 of FIG. 11, the navigation controller 1003 interacts with the primary positioning system 1004 to determine the navigation system's primary location estimate. In particular, the navigation controller 1003 may interact with the locating receiver 113 to obtain positioning information. In some embodiments, the positioning information determined by the locating receiver 113 may comprise all three coordinates (e.g., latitude, longitude, and elevation) of the primary location estimate's coordinates. In other embodiments, the positioning information determined by the locating receiver 113 may comprise only two coordinates (e.g., latitude and longitude) of the primary location estimate's coordinates. In the latter case, the navigation controller 1003 may interact with another component (of the primary positioning system 1004) to determine the remaining coordinate. For instance, if the missing coordinate is elevation, the navigation controller 1003 could interact with a radar altimeter to determine the altitude of the navigation system 1002. The positioning information from the locating receiver 113 and the radar altimeter 1005 may then be combined to give the complete primary location estimate.

Parallel to using the primary positioning system 1004 to determine the first primary location estimate, as shown by block 1203 of FIG. 12, the navigation controller 1003 interacts with the secondary positioning system 1006 to determine the navigation system's secondary location estimate. In particular, the navigation controller 1003 may interact a positioning system independent of the geo-positioning system 102 to obtain a location estimate. In some embodiments, the navigation controller 1003 may interact with an INS to determine the (coordinates of the) secondary location estimate. In some embodiments, the navigation controller 1003 may interact with a GPS receiver to determine the (coordinates of the) secondary location estimate. In some embodiments, the navigation controller 1003 may interact with some other positioning system to determine the secondary location estimate. Additionally, in some embodiments, the navigation controller 1003 may obtain multiple secondary location estimates from different positioning sub-systems of the secondary positioning system 1006.

After determining both the primary location estimate and the secondary location estimate, as shown by block 1204 of FIG. 12, the navigation controller 1003 compares the primary location estimate with the secondary location estimate. In particular, the navigation controller 1003 may compare the two location estimates to determine if they exceed a certain deviation threshold. In general, the deviation threshold represents the maximum level of expected variance between the primary location estimate and the secondary location estimate. In other words, the highest level of variance between the primary and secondary location estimates that could reasonably arise given the accuracy of the positioning systems used to obtain the primary and secondary location estimates. Accordingly, the deviation threshold could vary depending on the particular positioning system (i.e., particular positioning sub-system of the secondary positioning system 1006) used to obtain the secondary location estimate.

As shown by block 1205 of FIG. 12, if the result of the comparison has the two location estimates not exceed a deviation threshold, the primary and secondary location estimates are consistent with one another given the accuracy of their respective originating positioning systems. Consequently, the two position estimates do not (for this reason) represent a position anomaly. Conversely, if the result of the comparison has the two location estimates exceed a deviation threshold, the primary and secondary location estimates are not consistent with one another given the accuracy of their respective originating positioning systems. In other words, the two location estimates differ from one another to a degree greater than could be explained by random variation (from the navigation system's true location) due to the originating positioning system's accuracy limitations. Consequently, the two position estimates do represent a position anomaly and the position anomaly should be logged.

If the navigation controller 1003 determines that the primary and secondary location estimates do indicate a position anomaly, as shown by block 1206 of FIG. 12, the navigation controller 1003 records information about the primary and secondary location estimates, marks the recorded information as representing a detected position anomaly, and stores the recorded information in memory 1010. The recorded information may include information used to generate the primary location estimate, such as the received RF signal pulses, their associated arrival times, and the like. The recorded information may also include information used to generate the secondary location estimate, such as the positioning system used to generate the secondary location estimate, data used to generate the secondary location estimate (e.g., detected GPS signals), and the like.

After the navigation controller 1003 records the information about the position anomaly, as shown by block 1207 of FIG. 12, the navigation controller 1003 eventually communicates with the geo-positioning system 102 to transmit the recorded position anomaly information to the geo-positioning system 102. To transmit the information, the navigation controller 1003 may interact with network interface 1010 to establish a connection to the geo-positioning system 102. In particular, the network interface 1010 may communicate with the geo-positioning system 102 over a connection 112. Eventually, the recorded information may traverse the connection 112 and reach the network interface 106 of the geo-positioning system 102, where it is then transmitted to the central controller 103. The central controller 103 may store the obtained information in central memory 107 (in particular, in the central log database 109).

Note that, as previously mentioned, the navigation system 1002 may transmit the logged information at the (and, in some embodiments, only at the) happening of certain events. For example, for a navigation system 1002 integrated on an aircraft, the navigation system 1002 may wait until the aircraft is not in flight and is parked at a terminal. The rationale for transmitting only when parked at a terminal is that the available bandwidth is significantly greater than while in-flight. In other words, to the extent a connection is available in-flight, it is often bandwidth limited and (comparatively) more expensive. Thus, for the typically time-insensitive nature (at least on the scale of a few hours) of the logged information, it is most efficient to transmit it when not competing with limited in-flight bandwidth. In other embodiments, other triggering events are possible and some logged data may be transferred while in-flight. For example, if a more time-sensitive anomaly is detected, such as a spoofing anomaly, the logged event may be immediately transmitted to the geo-positioning system 102, even while in flight.

When parked, the navigation system 1002 may interface wirelessly to an access point in the terminal which may, ultimately, provide a connection to the geo-positioning system 102 (e.g., it provides access to the wider internet, which the geo-positioning system 102 is also connected to). Other connections are possible, such as a wired connection or a manually transfer of the data by a human operative from the navigation system 1002 to another system capable of connecting to the geo-positioning system 102 and transferring the logged data over the connection to the geo-positioning system 102.

Note that the navigation controller 1003 may also transmit additional information to the geo-positioning system 102 when transmitting records about various detected position anomalies.

Figure 13:
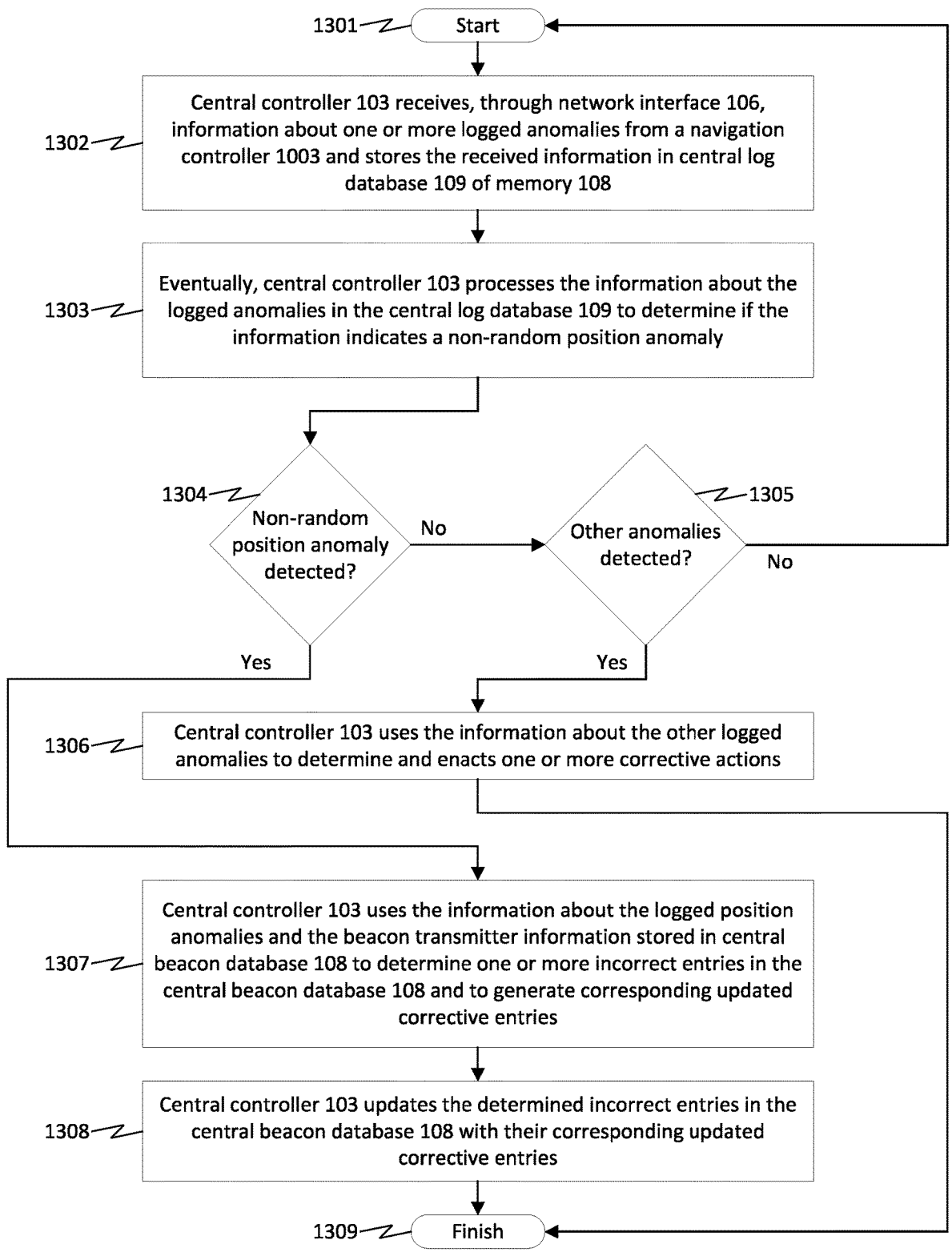
FIG. 13 is a flowchart illustrating the process of calibrating a geo-positioning system using reported position anomalies, such as was discussed in FIG. 11.

FIG. 13 is a flowchart illustrating the use of one or more recorded position anomalies to calibrate the geo-positioning system 102, such as was described in blocks 1103 and 1104 of FIG. 11.

To start, as shown by block 1302 of FIG. 13, the central controller 103 receives, through network interface 106, information about one or more logged anomalies (obtained from various navigation systems 1002). This information may include one or more logs about various position anomalies detected by various navigation systems 1002. The central controller 103 may store these received logs in the central log database 109 for eventual processing. Alternatively, the central controller 103 may immediately act on the received logs.

In general, the rationale for collecting multiple received logs is partially to obtain enough logs about a particular anomaly (including position anomalies) to determine if the detected anomaly is the result of a random error attributable to the navigation system 1002 that generated the log or if it represents a true anomaly originating from the geo-positioning system 102. The number of logs needed may vary depending on the level of trust the geo-positioning system 102 is configured to have in reports from various navigation systems 1002, which may itself vary depending on the particular model or type of navigation system 1002 the logs originate from. Similarly, the rationale for collecting multiple received logs is also partially to obtain enough logs about a particular anomaly (including position anomalies) to confirm the type of anomaly and to have enough information to sufficiently calculate the magnitude of the error causing the anomaly to a desired level of precision. This may allow the central controller 103 to determine a corrective action to resolve the error to within a desired level of precision. In general, the number of logs needed may vary depending on the desired level of precision and the type of anomaly.

After receiving the information about one or more logged anomalies, as shown by block 1303 of FIG. 13, the central controller 103 eventually processes the information about the logged anomalies in the central log database 109, particular the logged position anomalies, to determine if the logged information indicates a non-random position anomalies. In general, the central controller 103 may use a variety of statistical tests and methods to evaluate the logged position anomalies (and, in general, to evaluate the logged anomalies as a whole). As an example, a central controller 103 may attempt to sort the logged anomalies into groups, where each group represents a log anomaly resulting from a common source. One such method may be to group the anomalies based on their location, since the nature of the beacon transmitters 104 and 105 mean that typically the closest RF signal pulses from the beacon transmitters closest to a navigation system 1002 are used by the navigation system's locating receiver 113 to determine its location, and thus any errors attributable to the geo-positioning system 102 are likely to result from these beacon transmitters.

As shown by block 1304 of FIG. 13, if the central controller 103 does not determine that that the information about the logged anomalies indicates a non-random position anomalies, the logged information may still indicate other types of anomalies. Accordingly, the central controller 103 may proceed (as show by block 1305 of FIG. 13) to determine if the logged anomalies indicate a non-random anomaly of another type. Conversely, if the central controller 103 does determine that that the information about the logged anomalies indicates a non-random position anomalies, specific corrective action may be needed. Accordingly, the central controller 103 may proceed (as show by block 1307 of FIG. 13) to take action to correct the non-random position anomaly.

As shown by block 1305 of FIG. 13, if the central controller 103 does not determine that that the information about the logged anomalies indicates a non-random position anomalies, the central controller may proceed (i.e., to block 1305 of FIG. 13) to determine if the logged anomalies indicate a non-random anomaly of another type. If the central controller 103 determines that the logged anomalies do not indicate (or are insufficient to draw a conclusion), no corrective action may be needed and the method may end (and possibly repeat once more logged position anomalies are received). Conversely, if the central controller 103 does determine that that the information about the logged position anomalies indicates non-random anomalies that are not position anomalies, corrective action may be needed. Accordingly, the central controller 103 may proceed (as show by block 1306 of FIG. 13) to take action to correct (or at least address) the non-random anomalies.

If the central controller 103 determines that there is a non-random anomalies that are not position anomalies, as shown by block 1306 of FIG. 13, the central controller 103 uses the information about the logged position anomalies to determine one or more corrective actions to address the detected anomalies. The central controller 103 may then (at least partially, enact these corrective actions). For example, the central controller 103 may flag the anomalies for human intervention. The central controller 103 may additionally suggest a possible course of action to a human user to take in order to resolve the flagged anomalies.

If the central controller 103 determines that there is a non-random position anomalies, as shown by block 1307 of FIG. 13, the central controller 103 uses the information about the logged position anomalies and the beacon transmitter information stored in central beacon database 108 to determine one or more incorrect entries in the central beacon database 108 and to generate corresponding updated corrective entries.

After determining the incorrect entries and corresponding updated (and correct) entries, as shown by block 1308 of FIG. 13, the central controller 103 updates the determined incorrect entries in the central beacon database 108 with their corresponding updated corrective entries.

Figure 14:
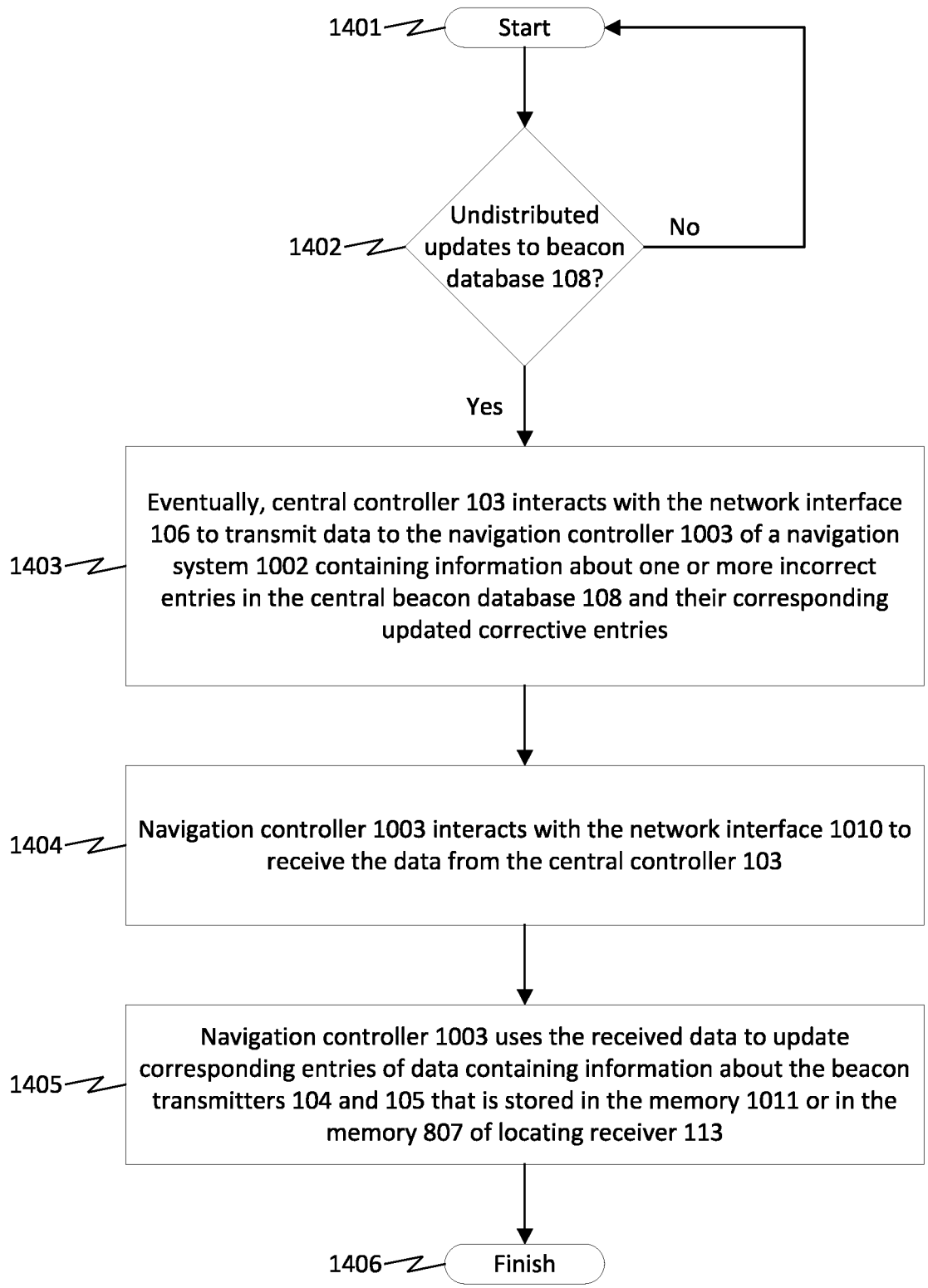
FIG. 14 is a flowchart illustrating the process of a geo-positioning system distributing information to various locating receivers that was updated during a process of self-calibration, such as those discussed in FIG. 11.

FIG. 14 is a flowchart illustrating the process of the geo-positioning system 102 distributing updated information to various locating receivers 113 after self-calibrating, such as was described in block 1105 of FIG. 11.

To start, as shown by block 1402 of FIG. 14, the central controller 103 determines if there have been updates to the beacon database 108 that have not yet been distributed. If the central controller 103 determines that there have not been updates to the beacon database 108 that have not yet been distributed, no updates need to be sent and the method may end (or repeat after future updates to the beacon database 108). Conversely, if the central controller 103 determines that there have been updates to the beacon database 108 that have not yet been distributed, updates may need to be sent and the process proceeds to block 1403.

If the central controller 103 determines that there are undistributed updates, as shown by block 1403 of FIG. 14, the central controller 103 may eventually interacts with the network interface 106 to transmit data to the navigation controller 1003 of a navigation system 1102 containing information about one or more incorrect entries in the central beacon database 108 and their corresponding updated corrective entries.

After the central controller 103 transmits the information about the updated entries to the navigation system 1102, as shown by block 1404 of FIG. 14, the navigation controller 1003 interacts with the network interface 1008 to receive the data from the central controller 103.

After the navigation controller 1003 receives the data from the central controller 103, as shown by block 1405 of FIG. 14, the navigation controller 1003 uses the received data to update corresponding entries of data containing information about the beacon transmitters 104 and 105 that is stored in the memory 1010 or in the memory 807 of locating receiver 113.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The devices, modules, and other functional units described in this disclosure can be implemented by hardware, or software, or a combination of hardware and software. One of ordinary skill in the art will also understand that the above described devices, modules, and other functions units may be combined or may be further divided into a plurality of sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

Now, therefore, the following is claimed:

1. A geo-positioning system for detecting and correcting anomalies, comprising:
   at least one primary beacon transmitter configured to generate and transmit radio-frequency (RF) signal pulses;
   a plurality of secondary beacon transmitters configured to receive and re-transmit the RF signal pulses;
   a navigation apparatus positioned on an aircraft and configured to determine a first geographic location estimate, comprising:
      a locating receiver apparatus configured to determine the first geographic location estimate associated with the locating receiver apparatus; and
      at least one processor configured to:
         detect one or more anomalies associated with determining the first geographic location estimate; and
         log information, in response to detecting one or more anomalies, indicating the one or more detected anomalies, wherein the logged information contains data associated with the determination of the first geographic location estimate; and a geo-positioning system controller of the geo-positioning system, comprising at least one processor configured to:
receive logged anomaly information from one or more navigation apparatuses;
based on the received logged anomaly information, determine one or more corrective actions configured to resolve one or more anomalies indicated by the received logged anomaly information; and
enact the determined one or more corrective actions.

2. The geo-positioning system of claim 1, wherein:
the navigation apparatus is further configured to determine a second geographic location estimate;
the navigation apparatus further comprises a secondary positioning apparatus configured to determine the second geographic location estimate associated with the secondary positioning apparatus;
the at least one processor of the navigation apparatus is configured to:
detect a position anomaly associated with determining the first geographic location estimate by:
comparing the first geographic location estimate with the second geographic location estimate; and
determining if the first geographic location estimate differs from the second geographic location estimate by more than a deviation threshold; and
log, in response to detecting a position anomaly, information indicating the detected position anomaly, wherein the logged information contains data associated with the determination of the first geographic location estimate; and
the geo-positioning system controller of the geo-positioning system further comprises memory configured to store (1) first information indicating relative positions of at least the plurality of secondary beacon transmitters and (2) second information indicating a turnaround time for each of the plurality of secondary beacon transmitters, wherein:
the received logged anomaly information from the one or more navigation apparatuses contains logged anomaly information about one or more position anomalies; and
the at least one processor of the geo-positioning system controller is further configured to:
determine, based on the received logged position anomaly information, one or more updated relative positions of the at least one primary beacon transmitter or the plurality of secondary beacon transmitters or determine one or more updated turnaround times of the plurality of secondary beacon transmitters; and
update the first information or the second information stored in the memory of the geo-positioning system controller to reflect the one or more updated relative positions of the at least one primary beacon transmitter or the plurality of secondary beacon transmitters or the one or more updated turnaround times of the plurality of secondary beacon transmitters.

3. The geo-positioning system of claim 2, wherein:
the at least one processor of the geo-positioning system controller is further configured to send information to the locating receiver apparatus indicating the one or more updated relative positions of the at least one primary beacon transmitter or the plurality of secondary beacon transmitters or indicating the one or more updated turnaround times of the plurality of secondary beacon transmitters; and
the at least one processor of the locating receiver apparatus is further configured to:
receive the information from the geo-positioning system controller indicating the one or more updated relative positions of the at least one primary beacon transmitter or the plurality of secondary beacon transmitters or indicating the one or more updated turnaround times of the plurality of secondary beacon transmitters; and
update the first information or the second information stored in the memory of the locating receiver apparatus to reflect the one or more updated relative positions of the at least one primary beacon transmitter or the plurality of secondary beacon transmitters or the one or more updated turnaround times of the plurality of secondary beacon transmitters.

4. The geo-positioning system of claim 2, wherein:
the secondary positioning apparatus comprises a global positioning system (GPS) receiver configured to determine the second geographic location estimate, wherein the second geographic location estimate is associated with the GPS receiver; and
the GPS receiver comprises:
a receiver configured to receive a plurality of GPS signals; and
at least one processor configured to determine the second geographic location estimate by determining a geographic location associated with the GPS receiver using the received plurality of GPS signals.

5. The geo-positioning system of claim 2, wherein:
the secondary positioning apparatus comprises an inertial navigation system (INS) configured to determine the second geographic location estimate, wherein the second geographic location estimate is associated with the INS; and
the INS comprises:
an interface configured to receive sensor data from one or more sensors, wherein the sensor data comprises velocity, orientation, and acceleration information; and
at least one processor configured to determine the second geographic location estimate by determining a geographic location associated with the INS using the received sensor data and a previously determined geographic location to calculate, via dead reckoning, a current geographic location associated with the INS.

6. The geo-positioning system of claim 1, wherein the locating receiver apparatus comprises:
a receiver configured to receive a plurality of the RF signal pulses;
memory configured to store (1) first information indicating relative positions of at least the plurality of secondary beacon transmitters beacon transmitters and (2) second information indicating a turnaround time for each of the plurality of secondary beacon transmitters; and
at least one processor configured to determine a geographic location associated with the locating receiver apparatus using the first information and the second information stored in the memory of the locating receiver apparatus and the received plurality of RF signal pulses.

7. The geo-positioning system of claim 6, wherein:
the plurality of the RF signal pulses includes at least a first RF signal pulse;
the first RF signal pulse is received by the receiver from one of the plurality of secondary transmitters; and
the at least one processor of the locating receiver apparatus is configured to determine the first geographic location estimate that is associated with the locating receiver apparatus by:
  determining a time of arrival at the locating receiver apparatus for the first RF signal pulse;
  determining a beacon identity of the one of the plurality of second beacon transmitters that transmitted the first RF signal pulse;
  adjusting the time of arrival of the first RF signal pulse using the second information stored in the memory of the locating receiver apparatus and the determined beacon identity; and
  determining a geographical location associated with the locating receiver apparatus using the adjusted time of arrival and the first information stored in the memory of the locating receiver apparatus.

8. The geo-positioning system of claim 1, wherein:
the RF signal pulses transmitted by the at least one primary beacon transmitter includes at least a first RF signal pulse;
the at least one primary beacon transmitter is configured to generate and transmit the first RF signal pulse by encoding a primary beacon transmitter identifier (ID) into the first RF signal pulse, wherein the encoded primary beacon transmitter ID uniquely identifies the at least one primary beacon transmitter; and
at least one of the plurality of secondary beacon transmitters is configured to re-transmit the first RF signal pulse by encoding a secondary beacon transmitter ID into the first RF signal pulse, wherein the encoded secondary beacon transmitter ID uniquely identifies the at least one of the plurality of secondary beacon transmitters re-transmitting the first RF signal pulse.

9. A geo-positioning system for providing positioning information and correcting reported anomalies, comprising:
at least one primary beacon transmitter configured to generate and transmit radio-frequency (RF) signal pulses;
a plurality of secondary beacon transmitters configured to receive and re-transmit the RF signal pulses; and
a geo-positioning system controller of the geo-positioning system, comprising at least one processor configured to resolve anomalies associated with the geo-positioning system by:
  receiving logged anomaly information comprising a plurality of entries logged in response to detecting one or more anomalies, wherein:
    the plurality of entries in the received logged anomaly information are received from one or more navigation apparatuses each positioned on an associated aircraft;
    each of the plurality of entries in the received logged anomaly information is associated with an anomaly involving determining a first geographic location estimate of an aircraft; and
    each of the plurality of entries in the received logged anomaly information contains data associated with the determination of the first geographic location estimate of the aircraft;
  determining, based on the received logged anomaly information, one or more corrective actions configured to resolve one or more anomalies indicated by the received logged anomaly information; and
  enacting the determined one or more corrective actions.

10. The geo-positioning system of claim 9, wherein:
the geo-positioning system controller of the geo-positioning system further comprises memory configured to store (1) first information indicating relative positions of at least the plurality of secondary beacon transmitters and (2) second information indicating a turnaround time for each of the plurality of secondary beacon transmitters; and
the at least one processor of the geo-positioning system controller is further configured to resolve position anomalies associated with the geo-positioning system by:
  receiving logged anomaly information comprising a plurality of position anomaly entries logged in response to detecting one or more position anomalies, wherein:
    the plurality of position anomaly entries in the received logged anomaly information are received from the one or more navigation apparatuses;
    each of the plurality of position anomaly entries in the received logged anomaly information is associated with a position anomaly involving determining the first geographic location estimate of an aircraft and determining a second geographic location estimate of the aircraft, wherein the position anomaly is detected by determining that the first geographic location estimate and the second geographic location estimate differ by more than a deviation threshold; and
    each of the plurality of position anomaly entries in the received logged anomaly information contains data associated with the determination of the first geographic location estimate of the aircraft;
  determining, based on the position anomaly entries in the received logged anomaly information, one or more updated relative positions of the at least one primary beacon transmitter or the plurality of secondary beacon transmitters or determine one or more updated turnaround times of the plurality of secondary beacon transmitters; and
  updating the first information or the second information stored in the memory of the geo-positioning system controller to reflect the one or more updated relative positions of the at least one primary beacon transmitter or the plurality of secondary beacon transmitters or the one or more updated turnaround times of the plurality of secondary beacon transmitters.

11. The geo-positioning system of claim 10, wherein the at least one processor of the geo-positioning system controller is further configured to send information to the navigation apparatuses associated with the entries in the received logged anomaly information indicating the one or more updated relative positions of the at least one primary beacon transmitter or the plurality of secondary beacon transmitters or indicating the one or more updated turnaround times of the plurality of secondary beacon transmitters, wherein the sent information is usable by the navigation apparatuses to update information stored on the navigation apparatuses to reflect the one or more updated relative positions of the at least one primary beacon transmitter or the plurality of secondary beacon transmitters or the one or more updated turnaround times of the plurality of secondary beacon transmitters.

12. The geo-positioning system of claim 10, wherein, for at least one of the plurality of position anomaly entries in the received logged anomaly information, the determination of the second geographic location estimate associated with the at least one position anomaly entry comprises determining a geographic location associated with the aircraft using a plurality of global positioning system (GPS) signals.

13. The geo-positioning system of claim 10, wherein, for at least one of the plurality of position anomaly entries in the received logged anomaly information, the determination of the second geographic location estimate associated with the at least one position anomaly entry comprises determining a geographic location associated with the aircraft using sensor data associated with the motion and orientation of the aircraft and a previously determine geographic location to calculate, via dead reckoning, a current geographic location associated with the aircraft, wherein the sensor data comprises velocity, orientation, and acceleration information.

14. The geo-positioning system of claim 9, wherein for at least one of the plurality of entries in the received logged anomaly information, the determination of the first geographic location estimate associated with the at least one entry comprises determining a geographic location associated with the aircraft using the plurality of transmitted and retransmitted RF signal pulses, stored third information indicating relative positions of at least the plurality of secondary beacon transmitters beacon transmitters, and stored fourth information indicating a turnaround time for each of the plurality of secondary beacon transmitters.

15. The geo-positioning system of claim 14, wherein determining a geographic location associated with the aircraft using the plurality of transmitted and retransmitted RF signal pulses, stored third information indicating relative positions of at least the plurality of secondary beacon transmitters beacon transmitters, and stored fourth information indicating a turnaround time for each of the plurality of secondary beacon transmitters comprises:
  determining, for a first RF signal pulse of the plurality of transmitted and retransmitted RF signal pulses, a time of arrival of the first RF signal pulse;
  determining a beacon identity of the one of the plurality of second beacon transmitters that transmitted the first RF signal pulse;
  adjusting the time of arrival of the first RF signal pulse using the stored fourth information and the determined beacon identity; and
  determining a geographical location associated with the aircraft using the adjusted time of arrival and the stored third information.

16. The geo-positioning system of claim 9, wherein:
  the RF signal pulses generated and transmitted by the at least one primary beacon transmitter include at least a first RF signal pulse;
  the at least one primary beacon transmitter is configured to generate and transmit the first RF signal pulse by encoding a primary beacon transmitter identifier (ID) into the first RF signal pulse, wherein the encoded primary beacon transmitter ID uniquely identifies the at least one primary beacon transmitter; and
  at least one of the plurality of secondary beacon transmitters is configured to re-transmit the first RF signal pulse by encoding a secondary beacon transmitter ID into the first RF signal pulse, wherein the encoded secondary beacon transmitter ID uniquely identifies the at least one of the plurality of secondary beacon transmitters re-transmitting the first RF signal pulse.

17. A method for providing positioning information and correcting reported anomalies, comprising:
  transmitting, by at least one primary beacon transmitter, a plurality of radio-frequency (RF) signal pulses;
  receiving and retransmitting, by a plurality of secondary beacon transmitters, the RF signal pulses;
  receiving logged anomaly information comprising a plurality of entries logged in response to detecting one or more anomalies, wherein:
    each of the plurality of entries in the received logged anomaly information is associated with an anomaly involving determining a first geographic location estimate of an aircraft; and
    each of the plurality of entries in the received logged anomaly information contains data associated with the determination of the first geographic location estimate of the aircraft;
  determining, based on the received logged anomaly information, one or more corrective actions configured to resolve one or more anomalies indicated by the received logged anomaly information; and
  enacting the determined one or more corrective actions.

18. The method of claim 17, further comprising:
  storing (1) first information indicating relative positions of at least the plurality of secondary beacon transmitters and (2) second information indicating a turnaround time for each of the plurality of secondary beacon transmitters;
  receiving logged anomaly information comprising a plurality of position anomaly entries logged in response to detecting one or more position anomalies, wherein:
    each of the plurality of position anomaly entries in the received logged anomaly information is associated with a position anomaly involving determining the first geographic location estimate of an aircraft and determining a second geographic location estimate of the aircraft, wherein the position anomaly is detected by determining that the first geographic location estimate and the second geographic location estimate differ by more than a deviation threshold; and
    each of the plurality of position anomaly entries in the received logged anomaly information contains data associated with the determination of the first geographic location estimate of the aircraft;
  determining, based on the position anomaly entries in the received logged anomaly information, one or more updated relative positions of the at least one primary beacon transmitter or the plurality of secondary beacon transmitters or one or more updated turnaround times of the plurality of secondary beacon transmitters; and
  updating the stored first information or the stored second information to reflect the one or more updated relative positions of the at least one primary beacon transmitter or the plurality of secondary beacon transmitters or the one or more updated turnaround times of the plurality of secondary beacon transmitters.

19. The method of claim 18, further comprising sending information to one or more senders associated with generating the entries in the received logged anomaly information indicating the one or more updated relative positions of the at least one primary beacon transmitter or the plurality of secondary beacon transmitters or indicating the one or more updated turnaround times of the plurality of secondary beacon transmitters, wherein the sent information is usable by the one or more senders to update information stored by the senders to reflect the one or more updated relative positions of the at least one primary beacon transmitter or the plurality of secondary beacon transmitters or the one or more updated turnaround times of the plurality of secondary beacon transmitters.

20. The method of claim 18, wherein:
for at least one of the plurality of position anomaly entries in the received logged anomaly information, the determination of the second geographic location estimate associated with the at least one position anomaly entry comprises determining a geographic location associated with the aircraft using a plurality of global positioning system (GPS) signals.

21. The method of claim 18, wherein for at least one of the plurality of position anomaly entries in the received logged anomaly information, the determination of the second geographic location estimate associated with the at least one position anomaly entry comprises determining a geographic location associated with the aircraft using sensor data associated with the motion and orientation of the aircraft and a previously determine geographic location to calculate, via dead reckoning, a current geographic location associated with the aircraft, wherein the sensor data comprises velocity, orientation, and acceleration information.

22. The method of claim 17, wherein for at least one of the plurality of entries in the received logged anomaly information, the determination of the first geographic location estimate associated with the at least one entry comprises determining a geographic location associated with the aircraft using the plurality of transmitted and retransmitted RF signal pulses, stored third information indicating relative positions of at least the plurality of secondary beacon transmitters beacon transmitters, and stored fourth information indicating a turnaround time for each of the plurality of secondary beacon transmitters.

23. The method of claim 22, wherein determining a geographic location associated with the aircraft using the plurality of transmitted and retransmitted RF signal pulses, stored third information indicating relative positions of at least the plurality of secondary beacon transmitters beacon transmitters, and stored fourth information indicating a turnaround time for each of the plurality of secondary beacon transmitters comprises:
determining, for a first RF signal pulse of the plurality of transmitted and retransmitted RF signal pulses, a time of arrival of the first RF signal pulse;
determining a beacon identity of the one of the plurality of second beacon transmitters that transmitted the first RF signal pulse;
adjusting the time of arrival of the first RF signal pulse using the stored fourth information and the determined beacon identity; and
determining a geographical location associated with the aircraft using the adjusted time of arrival and the stored third information.

24. The method of claim 17, wherein:
the plurality of radio-frequency (RF) signal pulses transmitted by the at least one primary beacon transmitter include at least a first RF signal pulse;
transmitting, by at least one primary beacon transmitter, the plurality of radio-frequency (RF) signal pulses comprises generating the first RF signal pulse by encoding a primary beacon transmitter identifier (ID) into the first RF signal pulse, wherein the encoded primary beacon transmitter ID uniquely identifies the at least one primary beacon transmitter; and receiving and retransmitting, by the plurality of secondary beacon transmitters, the RF signal pulses comprises, for at least one of the plurality of secondary beacon transmitters, receiving and re-transmitting the first RF signal pulse by encoding a secondary beacon transmitter ID into the first RF signal pulse, wherein the encoded secondary beacon transmitter ID uniquely identifies the at least one of the plurality of secondary beacon transmitters re-transmitting the first RF signal pulse.

25. A non-transitory computer readable medium comprising instructions that, when executed by one or more processors, cause the one or more processors to provide positioning information and correct reported anomalies by:
transmitting, by at least one primary beacon transmitter, a plurality of radio-frequency (RF) signal pulses;
receiving and retransmitting, by a plurality of secondary beacon transmitters, the RF signal pulses;
receiving logged anomaly information comprising a plurality of entries logged in response to detecting one or more anomalies, wherein:
each of the plurality of entries in the received logged anomaly information is associated with an anomaly involving determining a first geographic location estimate of an aircraft; and
each of the plurality of entries in the received logged anomaly information contains data associated with the determination of the first geographic location estimate of the aircraft;
determining, based on the received logged anomaly information, one or more corrective actions configured to resolve one or more anomalies indicated by the received logged anomaly information; and
enacting the determined one or more corrective actions.

26. The non-transitory computer readable medium of claim 25, wherein the instructions further cause the processors to provide positioning information and correct reported anomalies by:
storing (1) first information indicating relative positions of at least the plurality of secondary beacon transmitters and (2) second information indicating a turnaround time for each of the plurality of secondary beacon transmitters;
receiving logged anomaly information comprising a plurality of position anomaly entries logged in response to detecting one or more position anomalies, wherein:
each of the plurality of position anomaly entries in the received logged anomaly information is associated with a position anomaly involving determining the first geographic location estimate of an aircraft and determining a second geographic location estimate of the aircraft, wherein the position anomaly is detected by determining that the first geographic location estimate and the second geographic location estimate differ by more than a deviation threshold; and
each of the plurality of position anomaly entries in the received logged anomaly information contains data associated with the determination of the first geographic location estimate of the aircraft;
determining, based on the position anomaly entries in the received logged anomaly information, one or more updated relative positions of the at least one primary beacon transmitter or the plurality of secondary beacon transmitters or one or more updated turnaround times of the plurality of secondary beacon transmitters; and updating the stored first information or the stored second information to reflect the one or more updated relative positions of the at least one primary beacon transmitter or the plurality of secondary beacon transmitters or the one or more updated turnaround times of the plurality of secondary beacon transmitters.

* * * * *